US012220829B2

(12) United States Patent
Ueki et al.

(10) Patent No.: US 12,220,829 B2

(45) Date of Patent: Feb. 11, 2025

(54) SHEET PROCESSING SYSTEM

(71) Applicant: DUPLO SEIKO CORPORATION, Kinokawa (JP)

(72) Inventors: Kazuma Ueki, Kinokawa (JP); Akihiko Toki, Kinokawa (JP)

(73) Assignee: DUPLO SEIKO CORPORATION, Kinokawa (JP)

( * ) Notice: Subject to any disclaimer, the term of this patent is extended or adjusted under 35 U.S.C. 154(b) by 0 days.

(21) Appl. No.: 17/747,091

(22) Filed: May 18, 2022

(65) Prior Publication Data

US 2022/0371214 A1 Nov. 24, 2022

(30) Foreign Application Priority Data

May 21, 2021 (JP) ................................ 2021-086254

(51) Int. Cl.

*B26D 5/00* (2006.01)
*B26D 1/157* (2006.01)
*B26D 1/24* (2006.01)

(52) U.S. Cl.

CPC ........... *B26D 5/007* (2013.01); *B26D 1/1575* (2013.01); *B26D 1/245* (2013.01); *B26D 5/005* (2013.01)

(58) Field of Classification Search

CPC ...... B26D 5/007; B26D 1/1575; B26D 1/245; B26D 5/005; B26D 1/185; B26D 5/34; B26D 7/015; B26D 7/2628; B26D 5/32

See application file for complete search history.

(56) References Cited

U.S. PATENT DOCUMENTS 4,463,677 A * 8/1984 Kuehfuss ................ B41F 17/00 270/58.33
4,558,615 A * 12/1985 Kuehfuss ................ B41F 33/00 83/408

(Continued)

FOREIGN PATENT DOCUMENTS

CA 2635213 A1 * 8/2007 .............. B26D 1/18
JP 2002244228 A 8/2002

(Continued)

OTHER PUBLICATIONS

Office Action (Communication) issued on Oct. 19, 2022, by the European Patent Office in corresponding European Patent Application No. 22174330.5. (8 pages).

(Continued)

*Primary Examiner* — Jonathan G Riley

(74) *Attorney, Agent, or Firm* — Buchanan Ingersoll & Rooney PC

(57) ABSTRACT

A sheet processing system conveys a material sheet in a first direction; calculates an inclination angle of the first registration mark of the material sheet with respect to the first direction; and includes cutting blades configured to cut the material sheet to produce sheet pieces and a cutting direction adjustment mechanism configured to adjust a cutting direction to a direction of the inclination angle. The sheet processing system conveys the sheet piece in a second direction; and includes a guide member configured to extend in the second direction and to guide a cutting end of the sheet piece, a processing place position identification section configured to identify a position on a conveyance path of a processing place of the sheet piece based on the inclination angle, and processing mechanisms configured to perform processing on the processing place whose the position on a conveyance path is identified.

8 Claims, 22 Drawing Sheets

(56) References Cited

U.S. PATENT DOCUMENTS

| | | | | | |
|---|---|---|---|---|---|
| 5,235,515 | A * | 8/1993 | Ungpiyakul | A61F 13/15699 83/76.4 |
| 5,365,817 | A | 11/1994 | Maeda et al. | |
| 5,586,479 | A | 12/1996 | Roy et al. | |
| 6,820,526 | B1 | 11/2004 | Maddalon | |
| 8,051,757 | B2 * | 11/2011 | Maddalon | B26D 5/34 83/210 |
| 2003/0033918 | A1 * | 2/2003 | Maddalon | B26D 5/32 83/365 |
| 2004/0182211 | A1 * | 9/2004 | Maddalon | B26D 11/00 83/365 |
| 2009/0007744 | A1 * | 1/2009 | Maddalon | B26D 1/245 83/477.1 |
| 2022/0258370 | A1 * | 8/2022 | Maddalon | B41J 3/01 |

FOREIGN PATENT DOCUMENTS

| | | | | |
|---|---|---|---|---|
| JP | 2021041495 | A | 3/2021 | |
| WO | 2007/087606 | A1 | 8/2007 | |
| WO | WO-2017021886 | A1 * | 2/2017 | B26D 5/007 |

OTHER PUBLICATIONS

Office Action (Notice of Reasons for Refusal) issued on Aug. 13, 2024, in corresponding Japanese Patent Application No. JP 2021-086254 and English translation of the Office Action (6 pages).

* cited by examiner

SHEET PROCESSING SYSTEM

BACKGROUND OF THE INVENTION

Field of the Invention

The present disclosure relates to a sheet processing system that processes a sheet.

Description of the Related Art

For example, JP 2002-244228 A discloses a sheet processing apparatus that conveys a long sheet in a longitudinal direction thereof and cuts the long sheet at a predetermined processing position on a conveyance path. A plurality of rectangular images arranged in the longitudinal direction are formed on the long sheet. A cutting mechanism for cutting the long sheet parallel to the leading edge of the image is provided at the predetermined processing position. The cutting mechanism is configured to be able to adjust the inclination angle of the cutting direction with respect to the conveying direction of the long sheet in consideration of a case where the leading edge of the image is not orthogonal to the conveying direction of the long sheet.

SUMMARY OF THE INVENTION

In the case of the sheet processing apparatus described in JP 2002-244228 A, when the conveying direction of the long sheet and the leading edge of the image are orthogonal to each other, a plurality of rectangular sheet pieces are produced by cutting. Unlike this, when the conveying direction of the long sheet is not orthogonal to the leading edge of the image, a sheet piece not determined in shape, such as a parallelogram shape or a trapezoid shape, is produced by cutting.

When another (downstream side) sheet processing apparatus performs processing on a sheet piece not determined in shape produced by such a sheet processing apparatus, there is a possibility that the downstream side sheet processing apparatus cannot perform processing at a correct position on the sheet piece with high accuracy. That is, there is a possibility that the processing accuracy of the downstream side sheet processing apparatus decreases.

Thus, an object of the present disclosure is to suppress a decrease in processing accuracy in a sheet processing system in which an inclination angle of a cutting direction of a sheet with respect to a sheet conveying direction is adjustable and processing is performed on a sheet piece produced by the cutting.

In order to solve the above problem, according to one aspect of the present disclosure, provided is a sheet processing system including:

- a first conveying mechanism configured to convey a material sheet in a first direction;
- a first mark detection device configured to detect a first mark of the material sheet;
- a first mark inclination angle calculation section configured to calculate an inclination angle of the first mark with respect to the first direction based on a detection result of the first mark detection device;
- a cutting blade configured to cut the material sheet in a cutting direction intersecting a first direction to produce a plurality of sheet pieces;
- a cutting direction adjustment mechanism configured to adjust a cutting direction of the cutting blade to a direction of the inclination angle with respect to the first direction;
- a second conveying mechanism configured to convey the sheet piece in a second direction;
- a guide member configured to extend in the second direction and to guide a cutting end of the sheet piece formed by the cutting blade;
- a processing place position identification section configured to identify a position on a conveyance path of a processing place of the sheet piece based on the inclination angle; and
- a processing mechanism configured to perform processing on the place whose the position on the conveyance path is identified.

According to the present disclosure, in a sheet processing system in which an inclination angle in a cutting direction of a sheet with respect to a sheet conveying direction is adjustable and which performs processing on a sheet piece produced by the cutting, it is possible to suppress a decrease in the processing accuracy thereof.

DESCRIPTION OF THE PREFERRED EMBODIMENTS

Hereinafter, embodiments will be described in detail with reference to the drawings as appropriate. However, a detailed description more than necessary may be omitted. For example, a detailed description of already well-known matters and a redundant description for substantially the same configuration may be omitted. This is to avoid the following description from becoming unnecessarily redundant and to facilitate understanding by those skilled in the art.

It should be noted that the inventors provide the accompanying drawings and the following description in order for those skilled in the art to fully understand the present disclosure, and do not intend to limit the subject matter described in the claims by the accompanying drawings and the following description.

First, an overall configuration of a sheet processing system according to an embodiment of the present disclosure will be schematically described. Thereafter, a specific configuration of the sheet processing system will be described.

Figure 1:
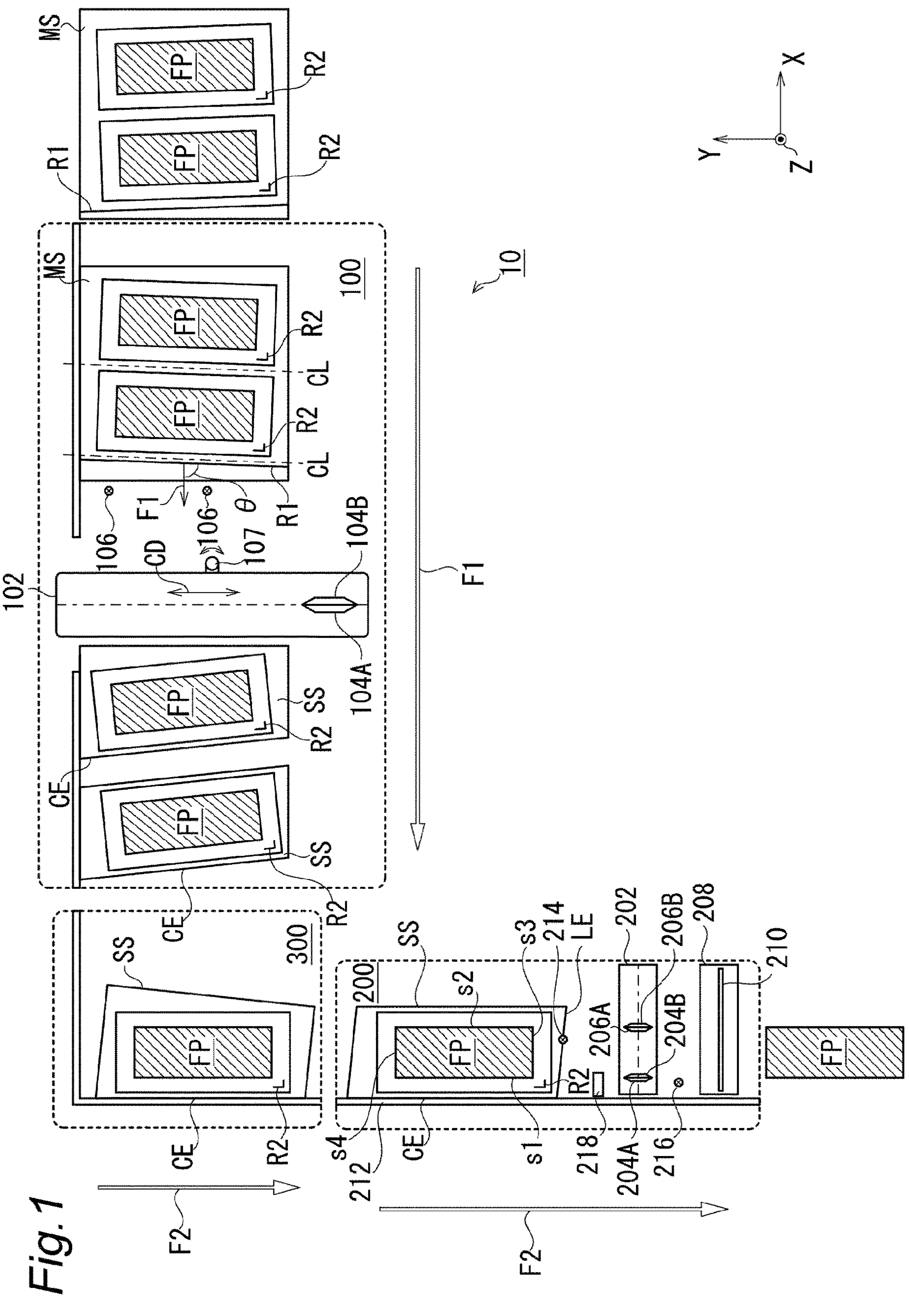
FIG. 1 is a schematic configuration diagram of a sheet processing system according to an embodiment of the present disclosure.

FIG. 1 is a schematic configuration diagram of a sheet processing system according to an embodiment of the present disclosure. It should be noted that the X-Y-Z orthogonal coordinate system shown in the drawings is for facilitating understanding of the present disclosure, and does not limit the present disclosure. The Z-axis direction indicates the vertical direction, and the X-axis direction and the Y-axis direction indicate the horizontal direction.

As shown in FIG. 1, a sheet processing system 10 according to the present embodiment is a system that processes a material sheet MS.

Specifically, in the case of the present embodiment, the material sheet MS is a cuttable rectangular sheet, such as paper or a resin sheet. In addition, in the material sheet MS, a plurality of images FP as final products, a first registration mark R1, and a second registration mark R2 corresponding to each of the images FP are provided in advance by, for example, printing or the like. In the case of the present embodiment, the first registration mark R1 is a linear mark, and the second registration mark R2 is an L-shaped mark.

In the case of the present embodiment, the sheet processing system 10 is configured to execute trimming of the image FP in which cutting along the outline of the image FP removes a portion of the material sheet MS other than the image FP. In order to accurately trim the image FP, the first registration mark R1 and the second registration mark R2 are used.

Figure 2:
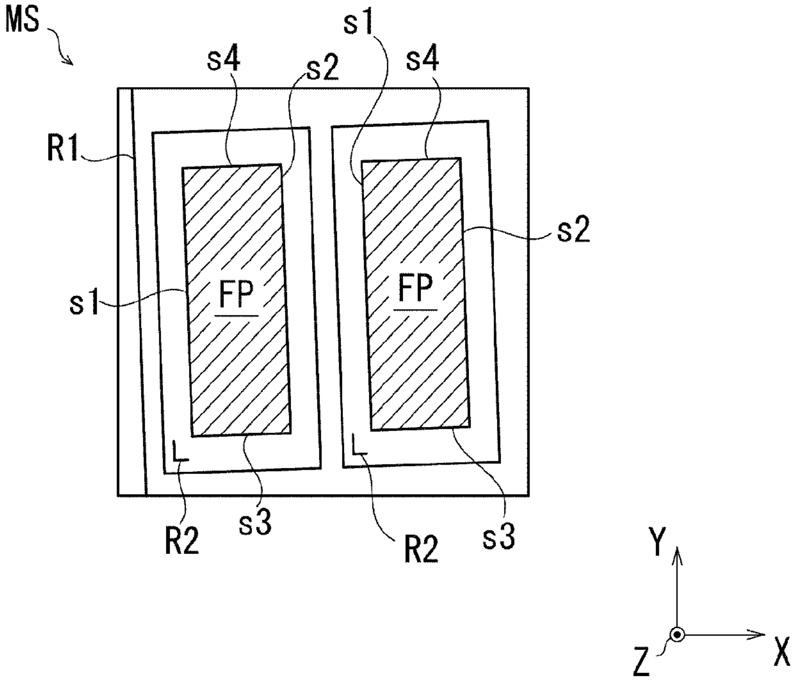
FIG. 2 is a plan view of a material sheet as an example to be processed by the sheet processing system.

FIG. 2 is a plan view of a material sheet as an example to be processed by the sheet processing system.

As shown in FIG. 2, in the material sheet MS, the plurality of images FP (that is, the first to fourth sides s1 to s4 constituting the outline of the image FP), the first registration mark R1, and the second registration mark R2 are provided (for example, printed) on each of the plurality of material sheets MS with a predetermined positional relationship with each other maintained. Specifically, the first registration mark R1 has a positional relationship parallel to the first side s1 and the second side s2 of the image FP, and has a positional relationship orthogonal to the third side s3 and the fourth side s4. In addition, the second registration mark R2 is provided spaced at a predetermined distance from the first registration mark R1, and is arranged at a predetermined position with respect to the image FP. That is, they are positioned relative to each other. On the other hand, these are positioned so as to have a predetermined positional relationship with respect to the outline of the material sheet MS, but actually, there is a variation in the positional relationships between the outlines of the plurality of respective material sheets MS due to printing misalignment or the like (that is, the predetermined positional relationship may or may not be obtained). As a result, in order to accurately trim the image FP, the sheet processing system 10 needs to use the first registration mark R1 and the second registration mark R2.

The sheet processing system 10 according to the present embodiment first cuts the material sheet MS to produce a plurality of sheet pieces SS. Each of the sheet pieces SS includes one image FP. To produce the sheet piece SS, the sheet processing system 10 includes a first sheet processing apparatus 100. It should be noted that in another embodiment, the sheet piece SS may include a plurality of images FP.

The first sheet processing apparatus 100 conveys the material sheet MS in the conveying direction F1 (X-axis direction) and causes the sheet processing module 102 to cut the material sheet MS at a predetermined processing position on the conveyance path. The sheet processing module 102 is mounted with an upper rotary cutting blade 104A and a lower rotary cutting blade 104B that cut the material sheet MS in a cutting direction CD intersecting the conveying direction F1. Each of the upper rotary cutting blade 104A and the lower rotary cutting blade 104B is provided in the sheet processing module 102 so as to be movable in the cutting direction CD, and rotates about a rotation center line extending in a direction orthogonal to the cutting direction CD in a plan view (viewed in the Z-axis direction) of the material sheet MS. The upper rotary cutting blade 104A moves above the material sheet MS, and the lower rotary cutting blade 104B moves downward of the material sheet MS, whereby the material sheet MS is cut. It should be noted that the material sheet MS may be cut by a shearing blade moving in the vertical direction (Z-axis direction) instead of the pair of rotary cutting blades 104A and 104B.

The pair of rotary cutting blades 104A and 104B of the sheet processing module 102 cuts the material sheet MS along the cutting line CL along the first registration mark R1. The cutting line CL coincides with the first registration mark R1 or is parallel to the first registration mark R1 at a predetermined distance.

In order for the pair of rotary cutting blades 104A and 104B of the sheet processing module 102 to cut the material sheet MS along the first registration mark R1, the first sheet processing apparatus 100 includes a plurality of first registration mark detection devices 106.

The plurality of first registration mark detection devices 106 are devices capable of detecting the first registration mark R1 on the material sheet MS, and are, for example, laser sensors that emit laser light from above toward the material sheet MS and detect the first registration mark R1 based on the reflected light thereof. The plurality of first registration mark detection devices 106 are arranged at a distance in a direction (Y-axis direction) orthogonal to the conveying direction F1 (X-axis direction) of the material sheet MS.

According to the first registration mark detection device 106, the first registration mark R1 on the material sheet MS during conveyance can be detected. In addition, the inclination angle θ of the first registration mark R1 with respect to the conveying direction F1 can be calculated based on the detection timing of each of the first registration mark detection devices 106 and the conveyance speed of the material sheet MS, that is, based on a difference in the detection timing of the first registration mark R1. The longer the time between the detection timings of the respective first registration mark detection devices 106, the larger the inclination angle θ of the first registration mark R1. In addition, when the detection timings are the same, the inclination angle a of the first registration mark R1 is 90 degrees, that is, the first registration mark R1 is orthogonal to the conveying direction F1.

It should be noted that the first registration mark detection device 106 for calculating the inclination angle θ of the first registration mark R1 is not limited to the laser sensor. For example, a camera or a laser scanner may be used. In this case, the material sheet MS is photographed or laser-scanned, and the inclination angle θ of the first registration mark R1 is calculated based on the image of the first registration mark R1 appearing in the photographed image or the scan image.

In order to cut the material sheet MS along the first registration mark R1 inclined at the inclination angle a with respect to the conveying direction F1, the cutting direction CD of the pair of rotary cutting blades 104A and 104B is made adjustable. In the case of the present embodiment, the sheet processing module 102 mounted with the pair of rotary cutting blades 104A and 104B is provided in the first sheet processing apparatus 100 swingably around a rotation center line (center line of the rotating shaft 107) entirely extending in the vertical direction (Z-axis direction). Swinging the sheet processing module 102 allows the cutting direction CD of the pair of rotary cutting blades 104A and 104B to be adjusted to the direction of the inclination angle θ with respect to the conveying direction F1.

Cutting the material sheet MS along the first registration mark R1 forms a cutting end CE along the first registration mark R1 in each of the produced sheet pieces SS. This cutting end CE is used as a reference of the sheet piece SS in a later step. Since the cutting end CE is formed along the first registration mark R1, the cutting end CE substantially functions as the first registration mark R1 and has a certain positional relationship with respect to the image FP and the second registration mark R2. That is, in each of the plurality of sheet pieces SS, the cutting end CE has a constant positional relationship without variation between the image FP and the second registration mark R2, similarly to the first registration mark R1. Such a positional relationship is defined (input) by an operator when setting information (job) for producing the image FP from the material sheet MS is created.

When a plurality of sheet pieces SS are produced from the material sheet MS by the first sheet processing apparatus 100, the sheet processing system 10 performs the following processing on the sheet pieces SS. In the case of the present embodiment, the sheet processing system 10 performs processing of trimming the image FP of the sheet piece SS, and includes a second sheet processing apparatus 200 for the processing.

The second sheet processing apparatus 200 conveys the sheet piece SS in the conveying direction F2 (Y-axis direction), and performs processing of trimming the image FP of the sheet piece SS at a predetermined processing position on the conveyance path.

It should be noted that in the present embodiment, the first sheet processing apparatus 100 and the second sheet processing apparatus 200 are disposed so that the conveying direction F1 (X-axis direction) of the first sheet processing apparatus 100 and the conveying direction F2 (Y-axis direction) of the second sheet processing apparatus 200 are orthogonal to each other. For delivery of the sheet piece SS between the first sheet processing apparatus 100 and the second sheet processing apparatus 200, an intermediate conveyance apparatus 300 is disposed between the first sheet processing apparatus 100 and the second sheet processing apparatus 200. The intermediate conveyance apparatus 300 changes the conveying direction of the sheet piece SS from the conveying direction F1 to the conveying direction F2.

In the case of the present embodiment, the second sheet processing apparatus 200 first performs longitudinal cut processing for cutting the sheet piece SS in the conveying direction F2 (Y-axis direction) at a first processing position on the conveyance path, and performs lateral cut processing for cutting the sheet piece SS in a direction (X-axis direction) orthogonal to the conveying direction F2 at a second processing position on the conveyance path.

The longitudinal cut processing is performed by a plurality of upper rotary cutting blades 204A and 206A and the lower rotary cutting blades 204B and 206B mounted on the sheet processing module 202. The upper rotary cutting blade 204A and the lower rotary cutting blade 204B form a pair, and the upper rotary cutting blade 206A and the lower rotary cutting blade 206B form a pair. The pair of rotary cutting blades 204A and 204B and the pair of rotary cutting blades 206A and 206B cut the sheet piece SS similarly to the pair of rotary cutting blades 104A and 104B in the first sheet processing apparatus 100.

The pair of rotary cutting blades 204A and 204B and the pair of rotary cutting blades 206A and 206B cut the sheet piece SS in the conveying direction F2 (Y-axis direction) at two positions. In addition, the pair of rotary cutting blades 204A and 204B and the pair of rotary cutting blades 206A and 206B are mounted on the sheet processing module 202 so as to be movable in a direction (X-axis direction) orthogonal to the conveying direction F2. Thus, the pair of rotary cutting blades 204A and 204B and the pair of rotary cutting blades 206A and 206B can cut the sheet piece SS at any position in the direction orthogonal to the conveying direction F2.

The lateral cut processing is performed by the shearing blade 210 mounted on the sheet processing module 208 disposed downstream of the sheet processing module 202 in the conveying direction F2 (Y-axis direction). The shearing blade 210 is mounted on the sheet processing module 208 so as to be movable in the vertical direction (Z-axis direction).

With regard to the processing place in the sheet piece SS on which the longitudinal cut processing and the lateral cut processing are performed by the sheet processing modules 202 and 208, the position on the conveyance path of the sheet piece SS is identified based on the inclination angle θ.

Figure 3:
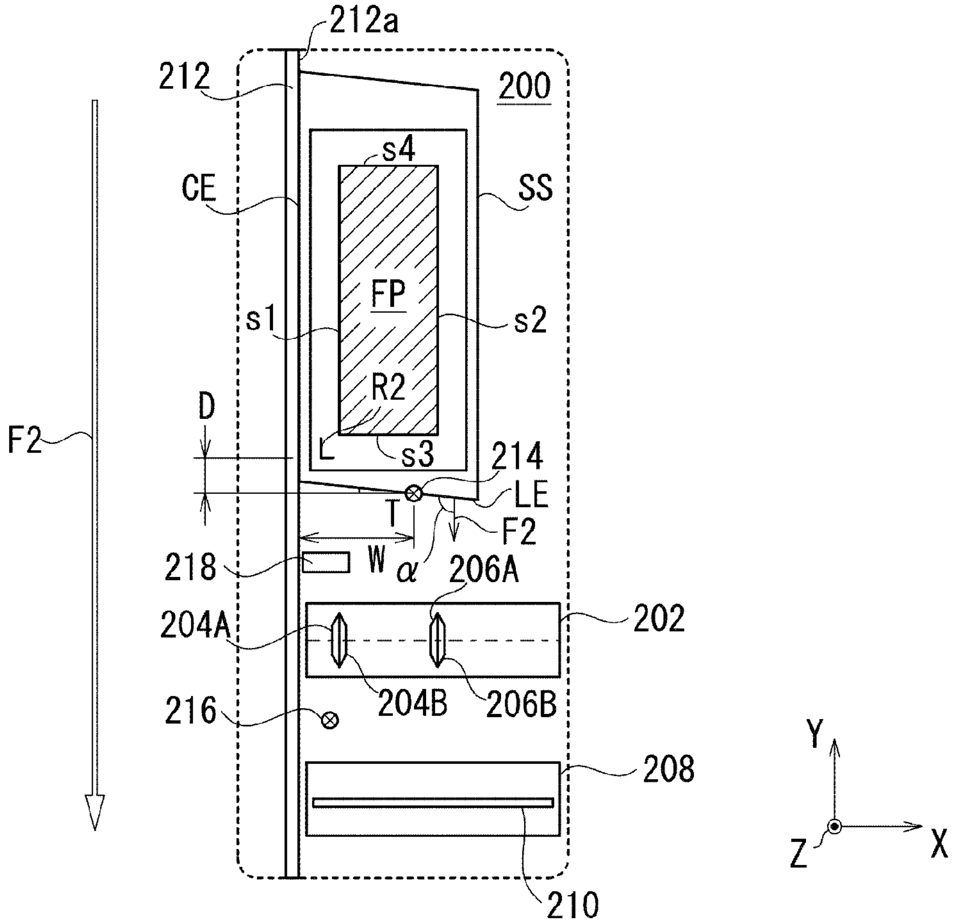
FIG. 3 is a diagram for illustrating a method for identifying a position on a conveyance path of a processing place of the sheet piece.

FIG. 3 is a diagram for illustrating a method for identifying a position on a conveyance path of a processing place of the sheet piece SS.

As shown in FIG. 3, the sheet processing module 202 longitudinally cuts the sheet piece SS along a longitudinal straight line extending in the conveying direction F2 (Y-axis direction) and passing through each of the sides s1 and s2 of the image FP. The sheet processing module 208 laterally cuts the sheet piece SS along a lateral straight line extending in a direction (X-axis direction) orthogonal to the conveying direction F2 and passing through each of the sides s3 and s4 of the image FP. In order to accurately perform these pieces of cutting, it is necessary to identify the position on the conveyance path of the processing place of the sheet piece SS, that is, the position on the conveyance path of each of the sides s1 to s4 of the image FP.

In order to identify the position on the conveyance path of each of the sides s1 to s4 of the image FP of the sheet piece SS, the second sheet processing apparatus 200 includes a guide member 212 that guides the sheet piece SS conveyed in the conveying direction F2 (Y-axis direction), first and second edge detection devices 214 and 216 that detect the leading end LE of the sheet piece SS, and a second registration mark detection device 218 that detects the second registration mark R2.

The guide member 212 includes a guide surface 212*a* extending in the conveying direction F2 (Y-axis direction). In addition, the guide surface 212*a* of the guide member 212 abuts on the cutting end CE of the sheet piece SS formed by the sheet processing module 102 in the first sheet processing apparatus 100. The sheet piece SS is conveyed in the conveying direction F2 while the cutting end CE thereof is guided by the guide surface 212*a* of the guide member 212. Thus, the positions on the conveyance path of the image FP of the sheet piece SS and the second registration mark R2 are identified in the direction (X-axis direction) orthogonal to the conveying direction F2.

The first and second edge detection devices 214 and 216 detect the leading end LE of the sheet piece SS being conveyed in the conveying direction F2 (Y-axis direction). The first and second edge detection devices 214 and 216 are, for example, a laser sensor or a photosensor that detects an edge of the sheet piece SS by blocking laser light by the sheet piece SS.

Based on the inclination angle 6 and the position T of the portion of the leading end LE of the sheet piece SS detected by the first edge detection device 214, the position on the conveyance path of the second registration mark R2 can be calculated in the conveying direction F2 (Y-axis direction).

For example, the distance D in the conveying direction F2 between the position T of the portion of the leading end LE of the sheet piece SS detected by the first edge detection device 214 and the second registration mark R2 can be calculated based on the distance W in the direction (X-axis direction) orthogonal to the conveying direction F2 (Y-axis direction) between the first edge detection device 214 and the second guide surface 212*a* and the angle a formed by the conveying direction F2 and the leading end LE of the sheet piece SS. The distance W is known in design. In addition, a positional relationship (that is, the distance between the first and second registration marks R1 and R2) between the cutting end CE of the sheet piece SS in contact with the guide member 212 (that is, the first registration mark R1) and the second registration mark R2 is also known. On the other hand, when the inclination angle a is 90 degrees (that is, when there is no printing deviation), since the positional relationship between the outline of the material sheet MS and the position of the registration mark R2 is a predetermined positional relationship, when the distance D is calculated, the distance between the leading end LE in the conveying direction F2 (Y-axis direction) and the second registration mark R2 can be used as a known value. Then, angle a is an angle obtained by subtracting inclination angle θ from 180 degrees. The distance D can be calculated using these four parameters.

The position on the conveyance path of the second registration mark R2 can be calculated in the conveying direction F2 (Y-axis direction) based on the distance D and the installation position of the first edge detection device 214 (that is, the position T of the portion of the leading end LE of the sheet piece SS). The timing at which the second registration mark R2 enters the detection area of the second registration mark detection device 218 can be calculated based on the calculated position on the conveyance path of the second registration mark R2 and the conveyance speed of the sheet piece SS.

The second registration mark detection device 218 executes sensing at a timing calculated based on the calculated position of the second registration mark R2 and the conveyance speed of the sheet piece SS, thereby reliably detecting the second registration mark R2. The second registration mark detection device 218 is, for example, a CCD scanner or a laser scanner. Detection of the second registration mark R2 by the second registration mark detection device 218 allows the position on the conveyance path of the image FP to be identified. That is, the position on the conveyance path of the processing place of the sheet piece SS to be processed by the sheet processing modules 202 and 208 can be identified.

When the position on the conveyance path of the image FP is identified, the pair of rotary cutting blades 204A and 204B of the sheet processing module 202 can be positioned with respect to the first side s1 of the image FP in the direction (X-axis direction) orthogonal to the conveying direction F2 (Y-axis direction). In addition, similarly, the pair of rotary cutting blades 206A and 206B can be positioned with respect to the second side s2 of the image FP. As a result, the pair of rotary cutting blades 204A and 204B and the pair of rotary cutting blades 206A and 206B can accurately cut the sheet piece SS along the longitudinal straight lines passing through the sides s1 and s2 of the image FP.

In addition, the timing at which each of the third side s3 and the fourth side s4 of the image FP reaches below the shearing blade 210 of the sheet processing module 208 can be calculated based on the identified position on the conveyance path of the image FP, the conveyance speed of the sheet piece SS, and the detection timing of the leading end LE of the sheet piece SS of the second edge detection device 216.

Specifically, the position on the conveyance path of the processing place in the conveying direction F2 (Y-axis direction) is calculated based on the position of the portion of the leading end LE of the sheet piece SS detected by the second edge detection device 216 and the inclination angle θ.

That is, the position on the conveyance path of the image FP (that is, the third side s3 and the fourth side s4) is identified. Then, based on the identified position on the conveyance path of the image FP and the conveyance speed of the sheet piece SS, the timing at which each of the third side s3 and the fourth side s4 of the image FP reaches below the shearing blade 210 of the sheet processing module 208 is calculated. As a result, the shearing blade 210 of the sheet processing module 208 can accurately cut the sheet piece SS along the lateral straight lines passing through the sides s3 and s4 of the image FP.

The sheet processing method of the sheet processing system 10 has been conceptually described so far. Hereinafter, a configuration of a sheet processing system 10 that implements this sheet processing method will be specifically described with an example.

Figure 4:
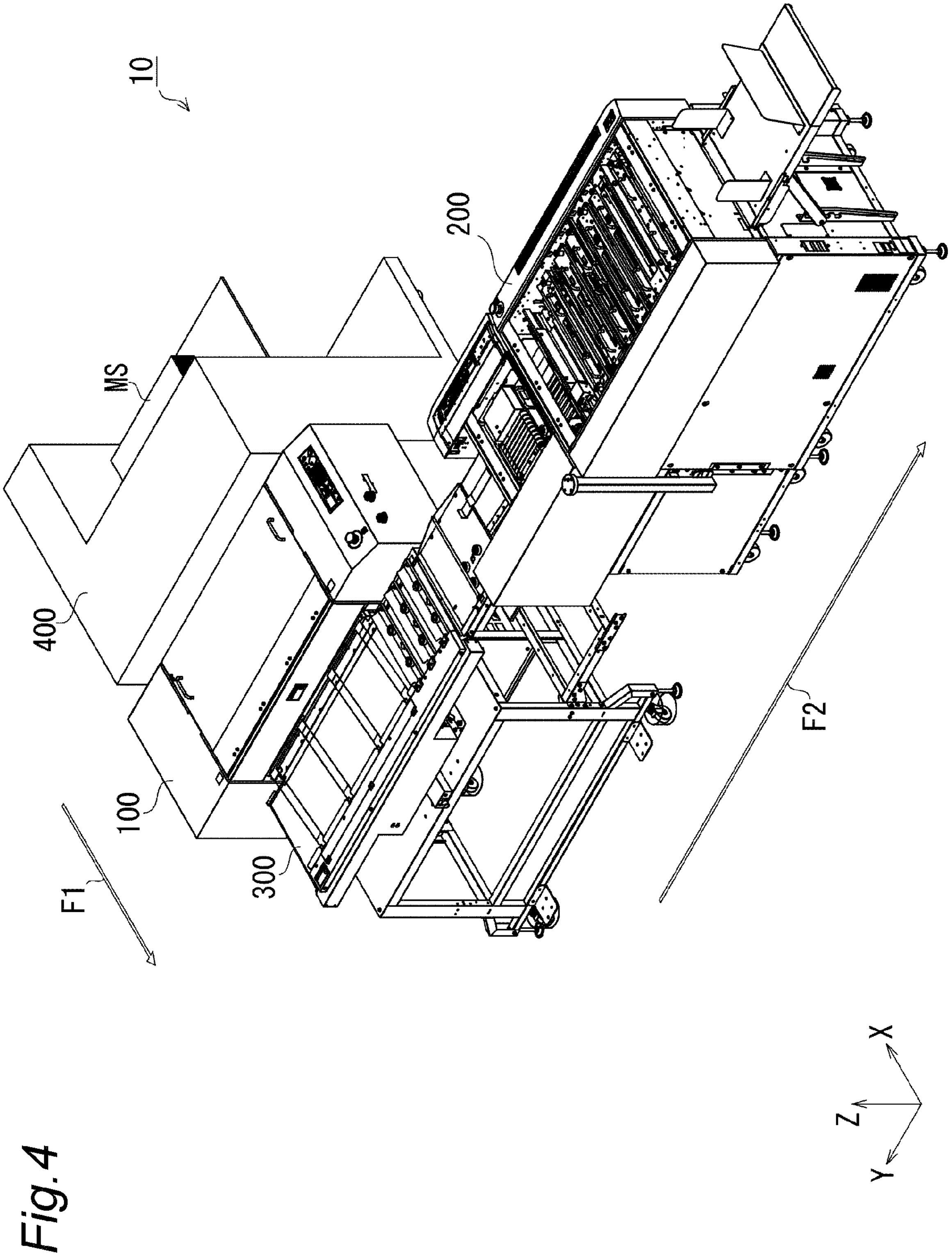
FIG. 4 is an overall perspective view of a sheet processing system of an example.

FIG. 4 is an overall perspective view of a sheet processing system of an example.

As shown in FIG. 4, a sheet processing system 10 of an example includes the first sheet processing apparatus 100 and the second sheet processing apparatus 200 described above, an intermediate conveyance apparatus 300 disposed between the first sheet processing apparatus 100 and the second sheet processing apparatus 200, and a sheet supplying apparatus 400 that supplies a material sheet MS to the first sheet processing apparatus 100. The sheet supplying apparatus 400 is configured to stock a plurality of material sheets MS and supply the material sheets MS one by one to the first sheet processing apparatus 100.

Figure 5:
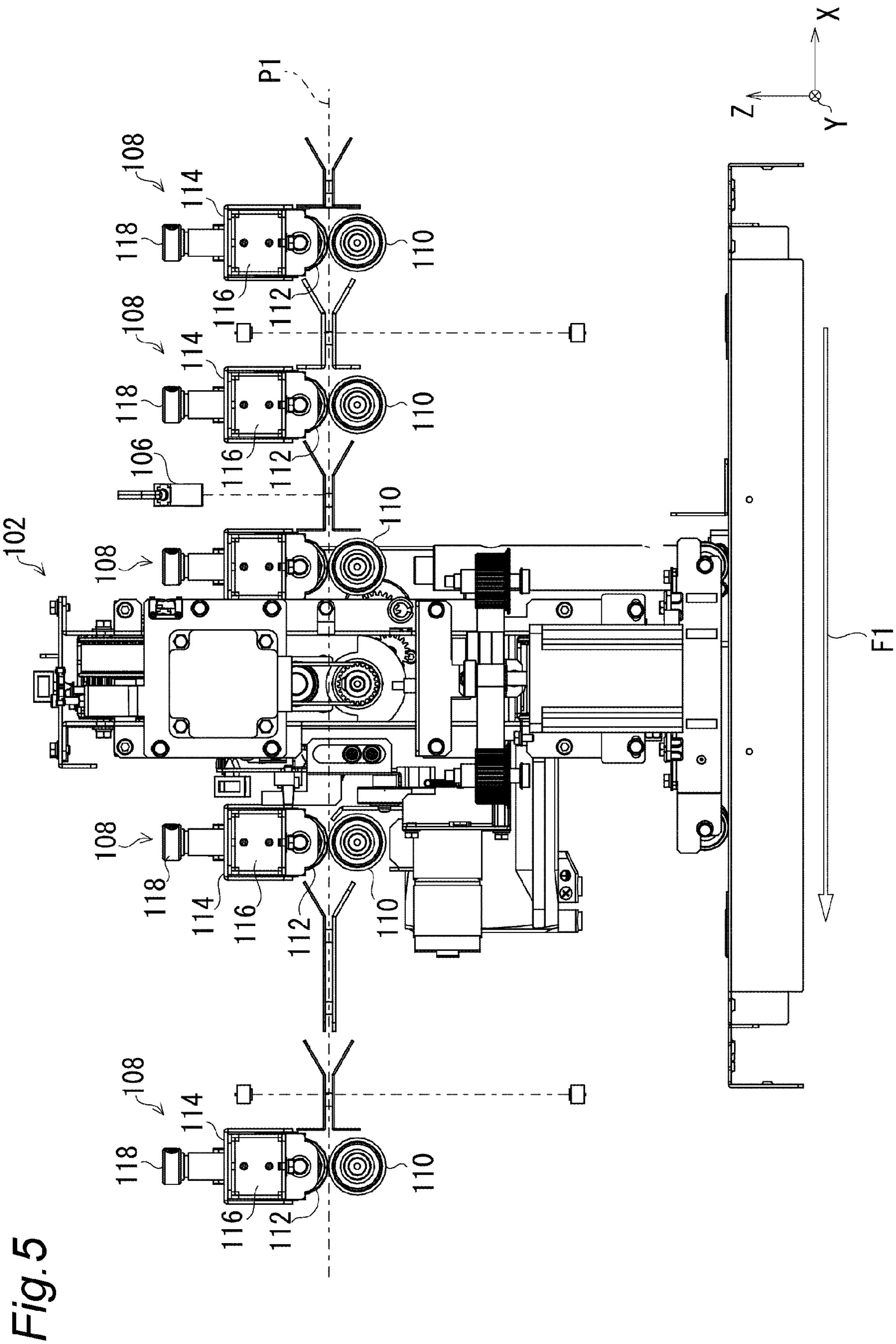
FIG. 5 is an internal structural diagram of a first sheet processing apparatus.

FIG. 5 is an internal structural diagram of the first sheet processing apparatus.

As shown in FIG. 5, the first sheet processing apparatus 100 includes a plurality of conveying roller units 108 as a conveying mechanism (first conveying mechanism) that conveys a material sheet MS and a sheet piece SS after cutting the material sheet MS along a conveyance path P1 in a conveying direction F1 (X-axis direction).

Figure 6:
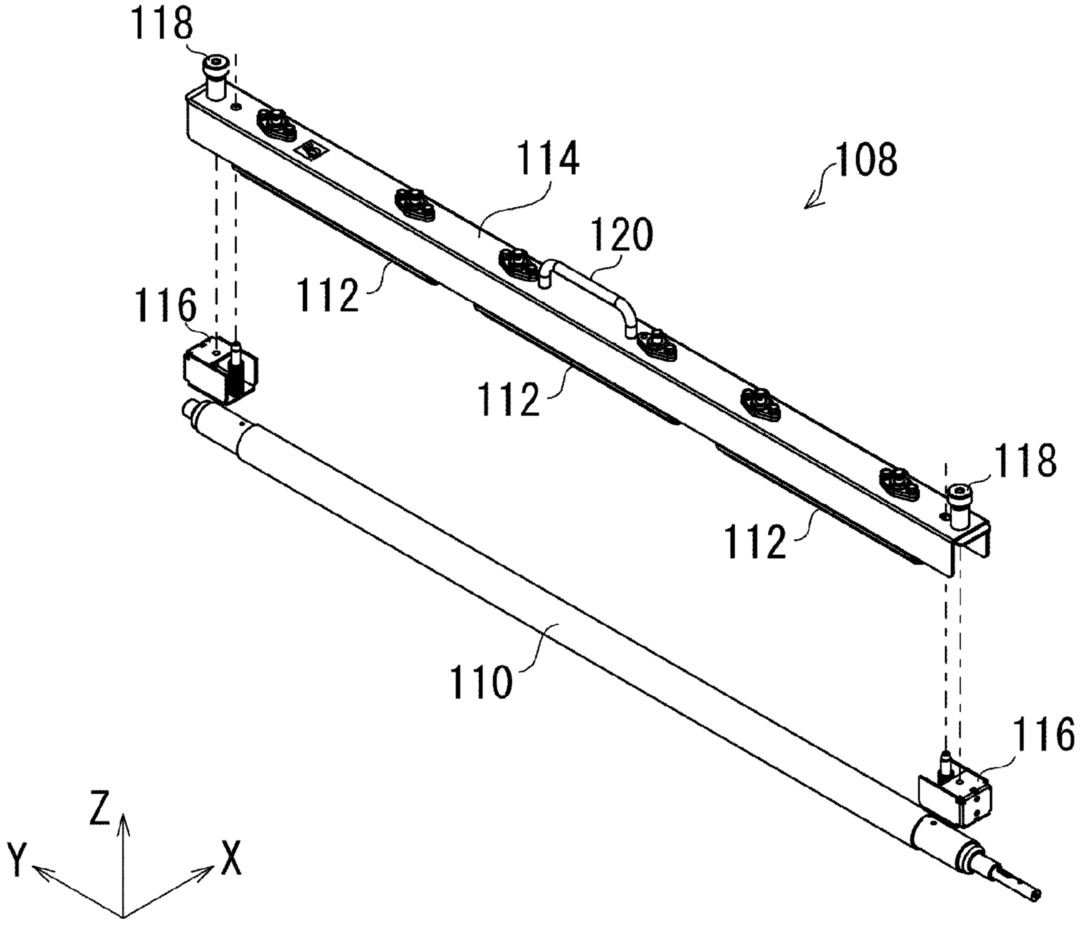
FIG. 6 is an exploded perspective view of a conveying roller unit.

FIG. 6 is an exploded perspective view of the conveying roller unit.

As shown in FIG. 6, each of the plurality of conveying roller units 108 includes a conveying roller 110 rotationally driven by a motor (not shown) or the like, and a presser roller 112 that presses the material sheet MS (or the sheet piece SS) toward the conveying roller 110. The conveying roller 110 and the presser roller 112 rotate about a rotation center line extending in a direction (Y-axis direction) orthogonal to the conveying direction F1.

In addition, in the conveying roller unit 108, the presser roller 112 can be separated from the conveying roller 110 in the vertical direction (Z-axis direction). Specifically, the presser roller 112 is rotatably supported by the cover member 114, and the conveying roller 110 has both ends rotatably supported by a casing frame (not shown) of the first sheet processing apparatus 100.

Both ends of the cover member 114 are attached to and detached from brackets 116 attached to a casing frame (not shown) of the first sheet processing apparatus 100 in the vertical direction (Z-axis direction). The fixing between both ends of the cover member 114 and the brackets 116 is performed by knurled screws 118 extending in the vertical direction. Therefore, the cover member 114, that is, the presser roller 112 can be removed in the vertical direction by loosening the knurled screw 118. As a result, when a jam or the like occurs between the conveying roller 110 and the presser roller 112, the material sheet MS (sheet piece SS) thereof can be easily removed. It should be noted that to facilitate attachment and detachment, the cover member 114 is provided with a handle 120.

As shown in FIG. 5, the first sheet processing apparatus 100 includes the above-described first registration mark detection device 106 that detects the first registration mark R1 on the material sheet MS conveyed on the conveyance path P1 in the conveying direction F1 (X-axis direction). The sheet processing module 102 is disposed downstream of the first registration mark detection device 106 in the conveying direction F1.

Figure 7A:
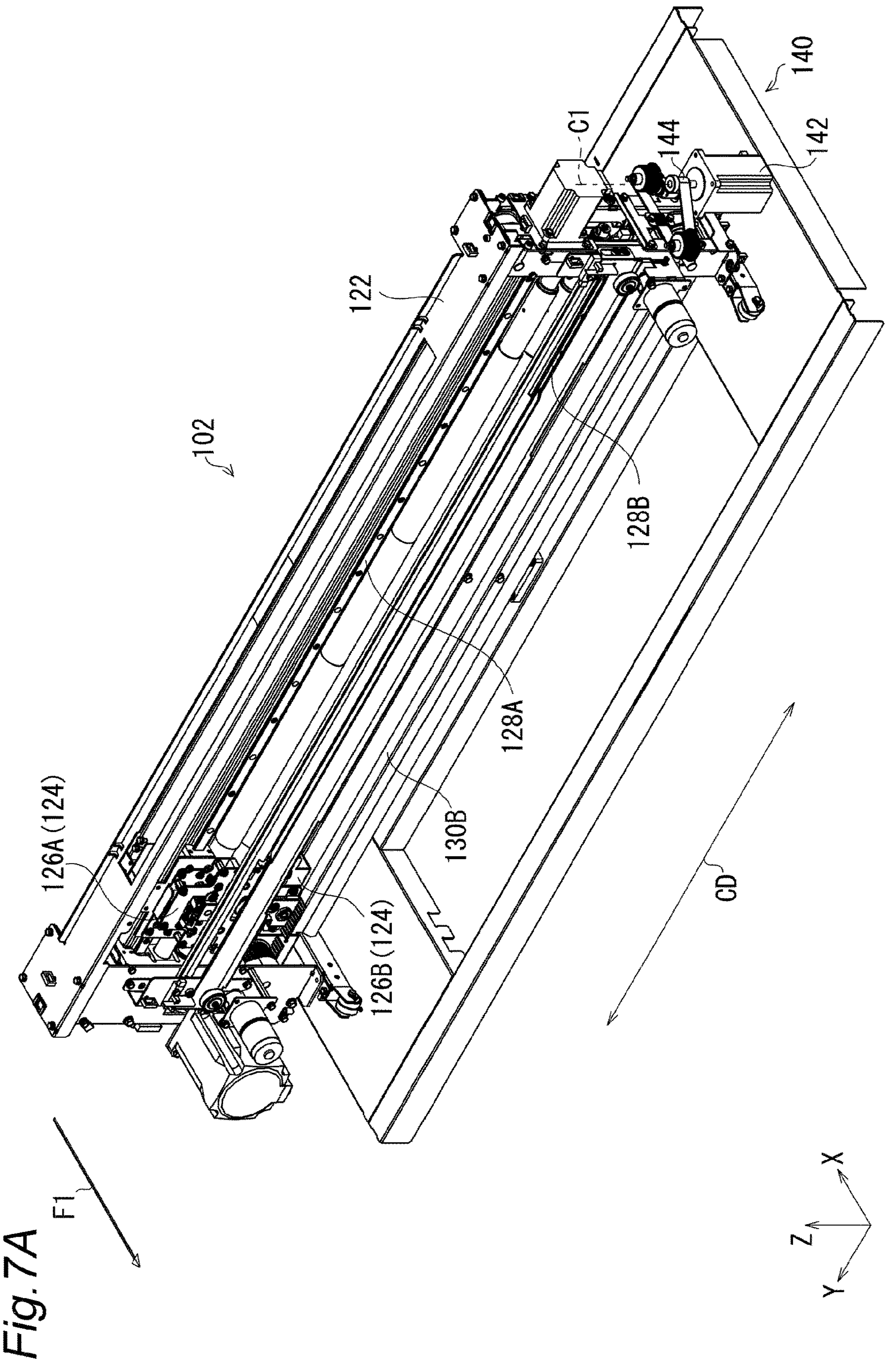
FIG. 7A is a downstream perspective view of a sheet processing module.

FIG. 7A is a downstream perspective view of the sheet processing module. In addition, FIG. 7B is an upstream perspective view of the sheet processing module.

Figure 7B:
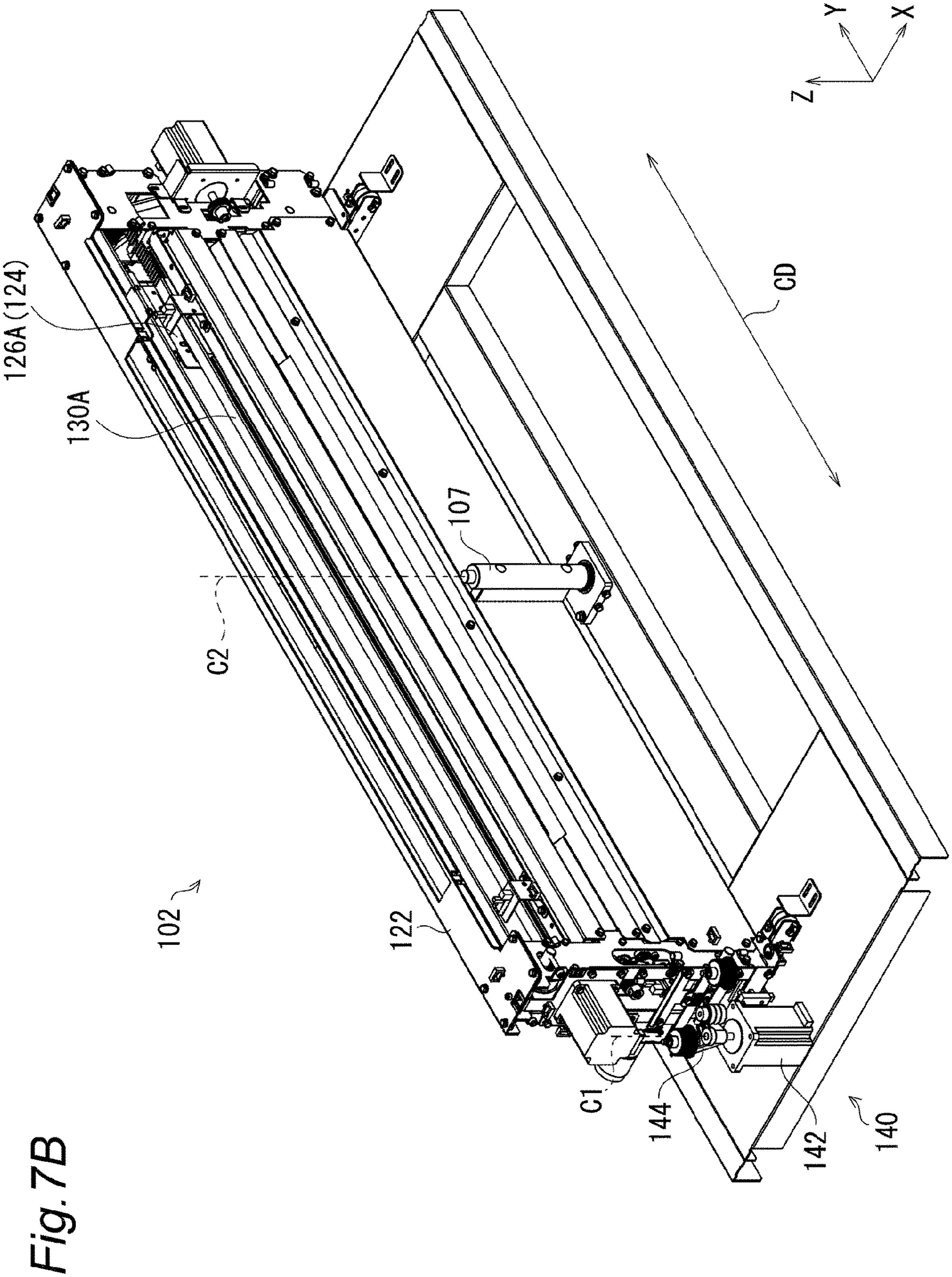
FIG. 7B is an upstream perspective view of the sheet processing module.

As shown in FIGS. 7A and 7B, the sheet processing module 102 includes a quadrangular frame shaped main body 122 through which the material sheet MS can pass in the conveying direction F1 (X-axis direction). In addition, the sheet processing module 102 is mounted with a sheet processing unit 124 including the above-described pair of rotary cutting blades 104A and 104B for cutting the material sheet MS.

Figure 8:
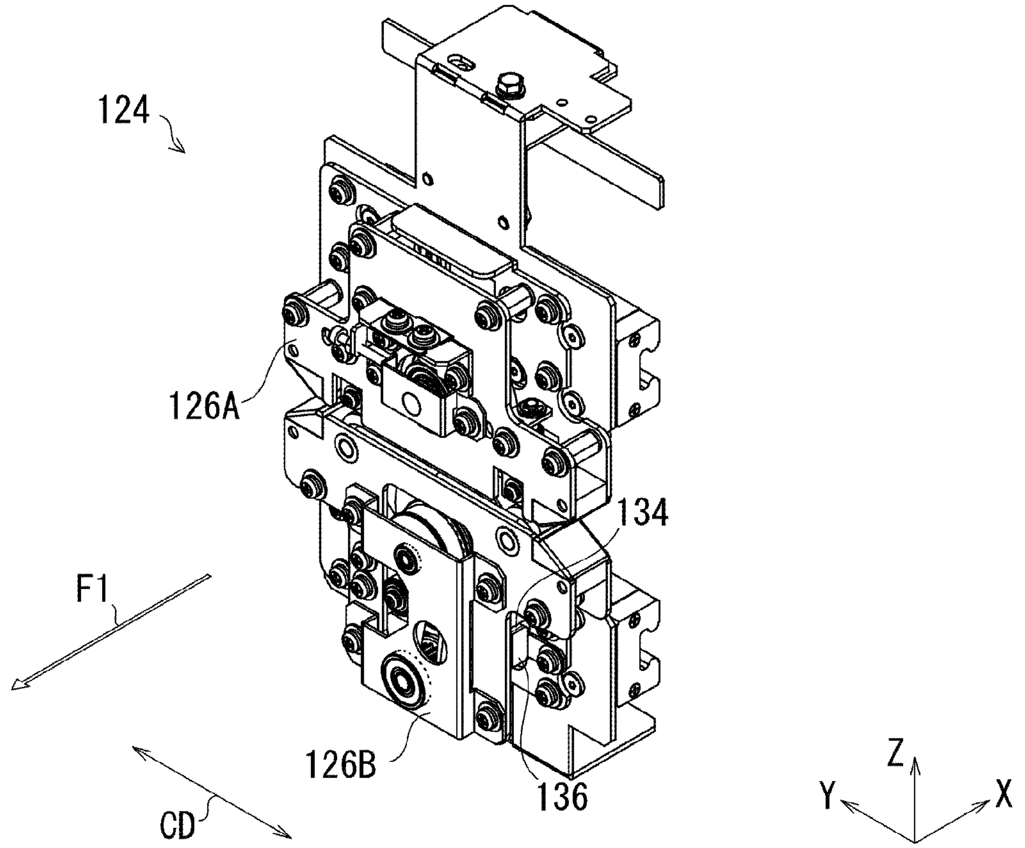
FIG. 8 is a perspective view of a sheet processing unit.
Figure 9:
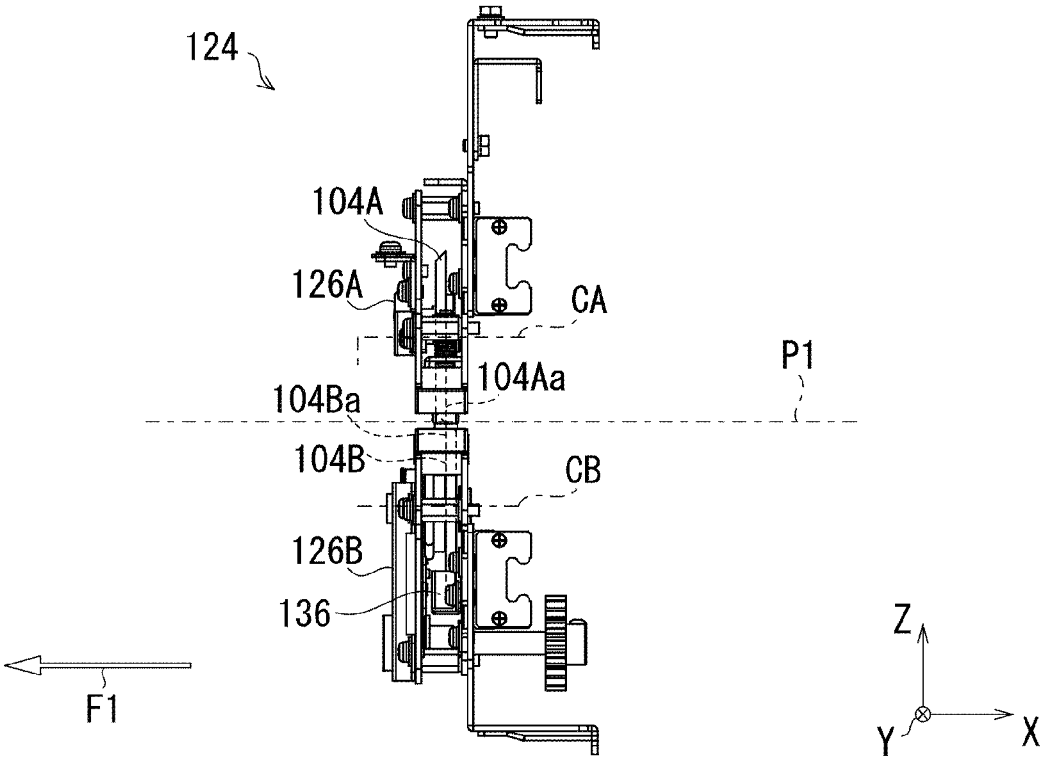
FIG. 9 is a side view of the sheet processing unit.

FIG. 8 is a perspective view of the sheet processing unit 124. In addition, FIG. 9 is a side view of the sheet processing unit 124. Then, FIG. 10 is a perspective view showing a pair of rotary cutting blades in the sheet processing unit 124.

Figure 10:
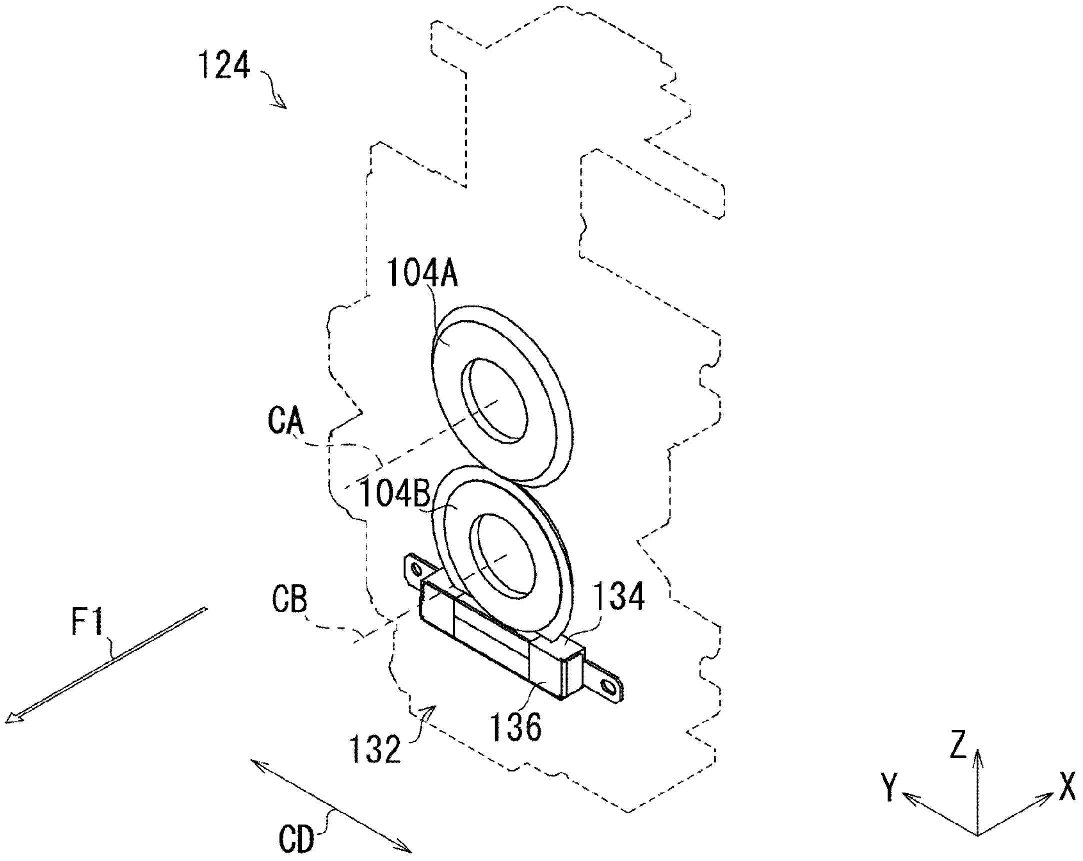
FIG. 10 is a perspective view showing a pair of rotary cutting blades in the sheet processing unit.

As shown in FIGS. 8 to 10, the sheet processing unit 124 includes an upper assembly 126A supporting the upper rotary cutting blade 104A and a lower assembly 126B supporting the lower rotary cutting blade 104B. The upper assembly 126A is movably supported in the cutting direction CD by the linear guide rail 128A shown in FIG. 7A, and is driven in the cutting direction CD by the driving belt 130A shown in FIG. 7B. In addition, the lower assembly 126B is movably supported in the cutting direction CD by the linear guide rail 128B shown in FIG. 7A, and is driven in the cutting direction CD by the driving belt 130B. These upper and lower assemblies 126A and 126B are synchronously driven and integrally move in the cutting direction CD. Thus, the pair of rotary cutting blades 104A and 1048 can cut the material sheet MS in the cutting direction CD.

As shown in FIG. 10, the sheet processing unit 124 is provided with an oil supply unit 132 that supplies oil for suppressing wear to the pair of rotary cutting blades 104A and 104B. Specifically, the oil supply unit 132 includes felt 134 provided in a lower portion of the lower assembly 126B in the sheet processing unit 124 and impregnated with oil, and a holder 136 that houses the felt 134. A part of the lower rotary cutting blade 104B is disposed inside the felt 134. Thus, when the pair of rotary cutting blades 104A and 104B rotate, first, the oil of the felt 134 is applied to the lower rotary cutting blade 104B, and the oil is supplied from the lower rotary cutting blade 104B to the upper rotary cutting blade 104A. The oil is supplied to the felt 134 through a gap through which the felt 134 can be seen. Alternatively, a supply hole for supplying oil or grease to at least one of the pair of rotary cutting blades 104A and 104B may be provided in the sheet processing unit. Furthermore, it is also possible that the holder 136 is attachable and detachable to and from the lower assembly 126B and that oil is supplied to the felt 134 inside the holder 136 in a detached state.

In addition, as shown in FIG. 9, in the sheet processing unit 124, the lower rotary cutting blade 104B is positioned upstream of the upper rotary cutting blade 104A in the conveying direction F1 (X-axis direction). The reason will be described with reference to FIG. 11.

Figure 11:
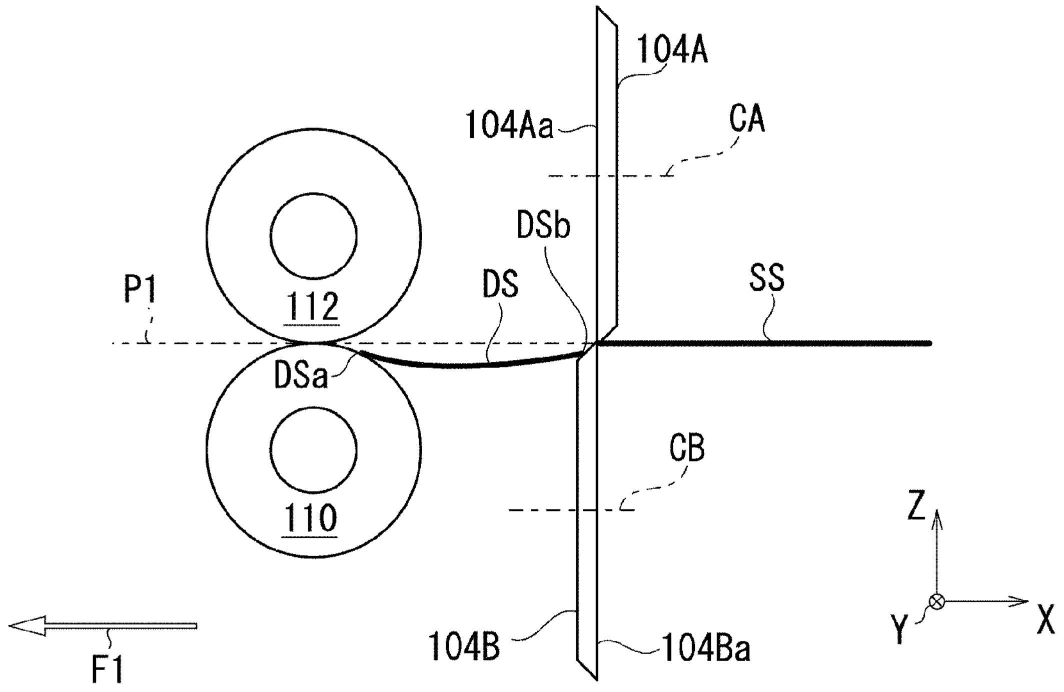
FIG. 11 is a diagram showing a comparative example in which a lower rotary cutting blade is positioned downstream of an upper rotary cutting blade in a sheet conveying direction.

FIG. 11 is a diagram showing a comparative example in which the lower rotary cutting blade is positioned downstream of the upper rotary cutting blade in the sheet conveying direction.

FIG. 11 shows a comparative example in which the lower rotary cutting blade 104B is positioned downstream of the upper rotary cutting blade 104A in the conveying direction F1 (X-axis direction), unlike the present example. In the case of this comparative example, when the pair of rotary cutting blades 104A and 104B cuts the material sheet MS to form the sheet piece SS, there is a possibility that the sheet portion DS to be discarded (the portion downstream of the first registration mark R1 in the conveying direction F1) does not fall toward the dust space (not shown). Specifically, there is a possibility that the front end DSa of the sheet portion to be discarded DS is caught by the conveying roller 110 positioned downstream of the pair of rotary cutting blades 104A and 104B in the conveying direction F1, and the rear end DSb is placed on the lower rotary cutting blade 104B. On the other hand, in the case of the present example, as shown in FIG. 9, since the lower rotary cutting blade 104B is positioned upstream of the upper rotary cutting blade 104A, the sheet portion to be discarded DS can fall without the rear end DSb thereof being placed on the lower rotary cutting blade 104B.

In the sheet processing unit 124, as shown in FIG. 9, the rotation center line CA of the upper rotary cutting blade 104A and the rotation center line CB of the lower rotary cutting blade 104B are preferably parallel to each other. In addition, the blade back surface 104Aa of the upper rotary cutting blade 104A and the blade back surface 104Ba of the lower rotary cutting blade 104B are preferably in contact with each other at a predetermined contact pressure. Thus, the material sheet MS can be cut with good sharpness. However, the contact pressure of the blade back surface may have variation, and a gap may occur between the blade back surfaces. As a countermeasure, the sheet processing unit 124 is configured to be capable of inclining the rotation center line CA of the upper rotary cutting blade 104A.

Figure 12:
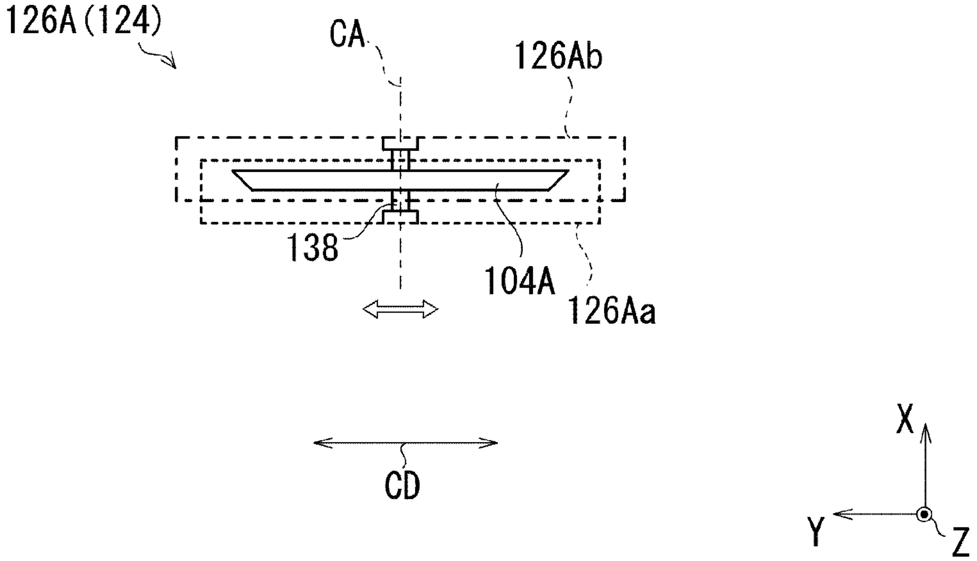
FIG. 12 is a schematic top view of the sheet processing unit for illustrating a mechanism for generating the inclination of a rotation center line of the upper rotary cutting blade.

FIG. 12 is a schematic top view of the sheet processing unit for illustrating a mechanism for generating the inclination of the rotation center line of the upper rotary cutting blade.

As shown in FIG. 12, in the sheet processing unit 124 (upper assembly 126A thereof), the support shaft 138 that supports the upper rotary cutting blade 104A has one end supported by the front portion 126Aa of the upper assembly 126A and the other end supported by the rear portion 126Ab of the upper assembly 126A. The front portion 126Aa is configured to be movable in the cutting direction CD with respect to the rear portion 126Ab. Movement of the front portion 126Aa with respect to the rear portion 126Ab inclines the support shaft 138, thereby inclining the rotation center line CA of the upper rotary cutting blade 104A.

Figure 13:
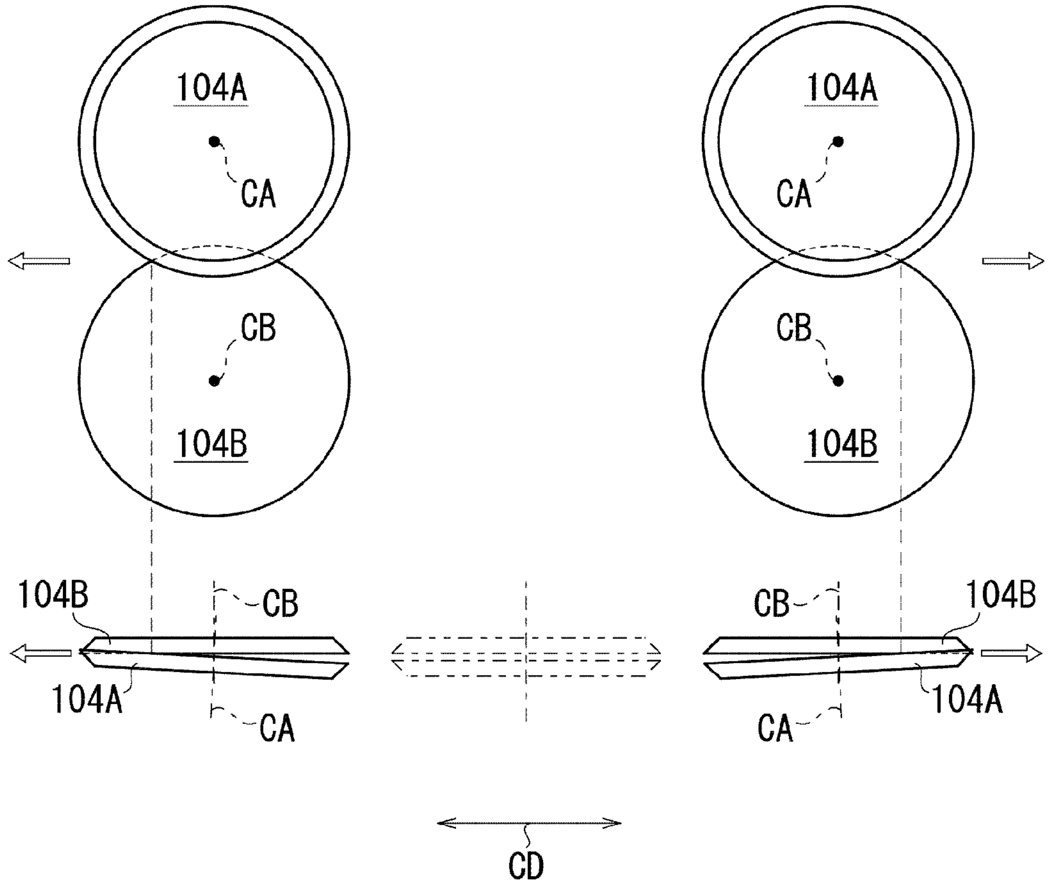
FIG. 13 is a diagram showing a pair of rotary cutting blades that move with the rotation center line of the upper rotary cutting blade inclined.

FIG. 13 shows a pair of rotary cutting blades that move with the rotation center line of the upper rotary cutting blade inclined.

As shown in FIG. 13, when the pair of rotary cutting blades 104A and 104B move in one traveling direction (hollow arrow) of the cutting direction CD, the front portion 126Aa shifts toward the traveling direction in the upper assembly 126A, whereby the rotation center line CA of the upper rotary cutting blade 104A is inclined. With this, in the portion where the upper rotary cutting blade 104A and the lower rotary cutting blade 104B overlap each other, the tip in the traveling direction of the upper rotary cutting blade 104A comes into contact with the tip in the traveling direction of the lower rotary cutting blade 104B. Thus, the pair of rotary cutting blades 104A and 104B can cut the material sheet MS with good sharpness even when a gap is generated (two-dot chain line) between the blade back surfaces 104Aa and 104Ba at the time of stopping as viewed from above.

It should be noted that the rotation center line CB of the lower rotary cutting blade 104B is maintained in a state of being orthogonal to the cutting direction CD without being inclined. It should be noted that instead of the rotation center line CA of the upper rotary cutting blade 104A, the rotation center line CB of the lower rotary cutting blade 104B may be inclined. In addition, both the rotation center lines CA and CB may be inclined.

Returning to FIGS. 7A and 7B, the sheet processing module 102 includes a tilting mechanism 140 that tilts the main body 122. The tilting mechanism 140 includes a motor 142 that rotates about a rotation center line C1 extending in the vertical direction (Z-axis direction), and a driving belt 144 driven by the motor 142. One end in a direction (Y-axis direction) orthogonal to the conveying direction F1 (X-axis direction) of the main body 122 is fixed to a portion shifted in the conveying direction F1 in the driving belt 144. When the motor 142 rotates, the main body 122 of the sheet processing module 102 swings about the center line C2 of the rotating shaft 107. The tilting mechanism 140 adjusts the cutting direction CD of the sheet processing module 102. That is, the tilting mechanism 140 functions as a cutting direction adjustment mechanism that adjusts the cutting direction CD to the direction of the inclination angle 0 with respect to the conveying direction F1 shown in FIG. 1.

Figure 14:
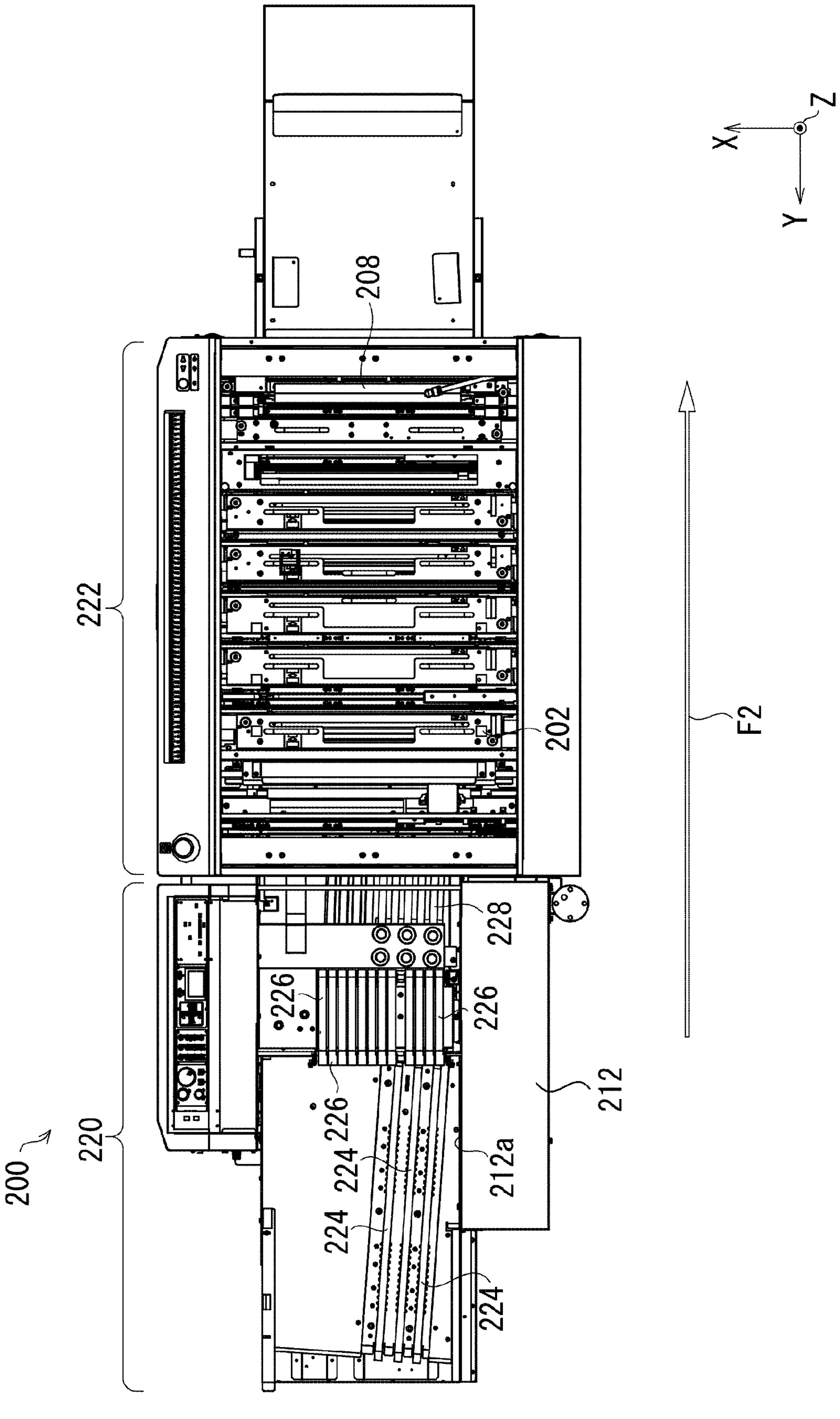
FIG. 14 is a top view of a second sheet processing apparatus.
Figure 15:
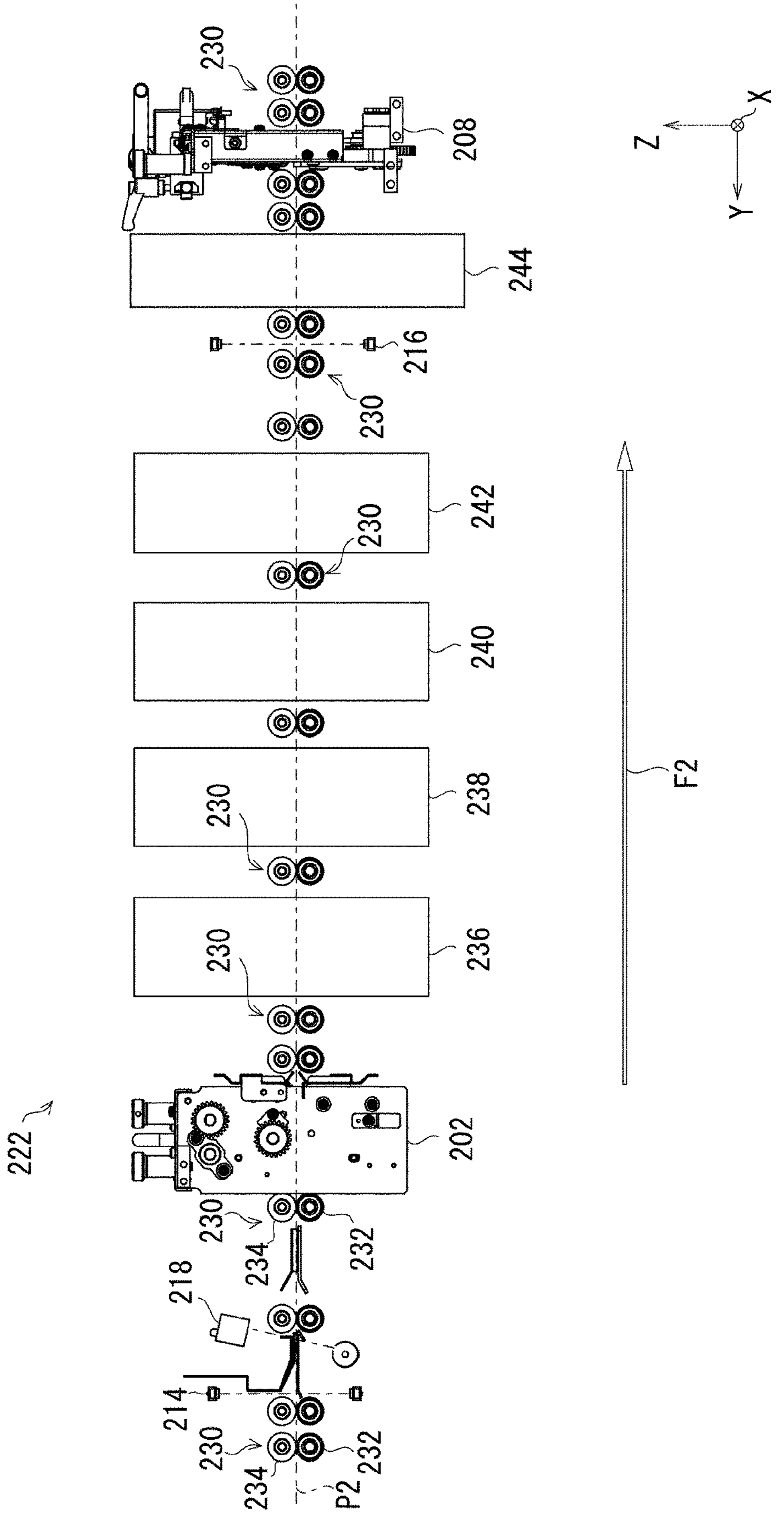
FIG. 15 is an internal structural diagram of a sheet processing section of the second sheet processing apparatus.

FIG. 14 is a top view of the second sheet processing apparatus. In addition, FIG. 15 is an internal structural diagram of a sheet processing section of the second sheet processing apparatus.

As shown in FIG. 14, the second sheet processing apparatus 200 is roughly divided into a sheet attitude adjustment section 220 that adjusts the attitude of the sheet piece SS and a sheet processing section 222 that executes processing on the sheet piece SS.

The sheet attitude adjustment section 220 of the second sheet processing apparatus 200 is configured to cause the cutting end CE of the sheet piece SS to follow the guide surface 212*a* while conveying the sheet piece SS. In the case of the present example, a part of the casing of the second sheet processing apparatus 200 functions as the guide member 212 including the guide surface 212*a*.

The sheet attitude adjustment section 220 includes a plurality of oblique belt conveyors 224 on which the sheet piece SS is placed and which conveys the placed sheet piece SS toward the guide surface 212*a*. In addition, the sheet attitude adjustment section 220 includes a plurality of conveying belts 226 that come into contact with the upper surface of the sheet piece SS in a state where the cutting end CE abuts on the guide surface 212*a* and convey the sheet piece SS in the conveying direction F2 (Y-axis direction). Then, the sheet attitude adjustment section 220 includes a plurality of oblique belt conveyors 228 that convey the sheet piece SS conveyed by the conveying belt 226 toward the guide surface 212*a*. Thus, the sheet piece SS is conveyed into the sheet processing section 222 with the cutting end CE thereof abutting on the guide surface 212*a*.

As shown in FIG. 15, the sheet processing section 222 of the second sheet processing apparatus 200 includes a plurality of conveying roller units 230 as a conveying mechanism (second conveying mechanism) that conveys the sheet piece SS along the conveyance path P2 in the conveying direction F2 (Y-axis direction). As with the conveying roller unit 108 in the first sheet processing apparatus 100, the conveying roller unit 230 includes a conveying roller 232 rotationally driven by a motor (not shown) or the like, and a presser roller 234 that presses the sheet piece SS toward the conveying roller 232. The conveying roller 232 and the presser roller 234 rotate about a rotation center line extending in a direction (X-axis direction) orthogonal to the conveying direction F2.

A plurality of sheet processing modules 202,208, and 236 to 244 (processing mechanisms) are disposed between the plurality of conveying roller units 230. The sheet processing modules 236 to 244 other than the sheet processing modules 202 and 208 are modules that perform processing such as perforation forming processing and crease forming processing, other than longitudinal cut processing and lateral cut processing, and are modules that perform processing on processing places other than the four sides s1 to s4 of the image FP. In addition, the above-described first and second edge detection devices 214 and 216 that sense the sheet piece SS passing between the plurality of conveying roller units 230 and the second registration mark detection device 218 are provided in the sheet processing section 222.

Figure 16:
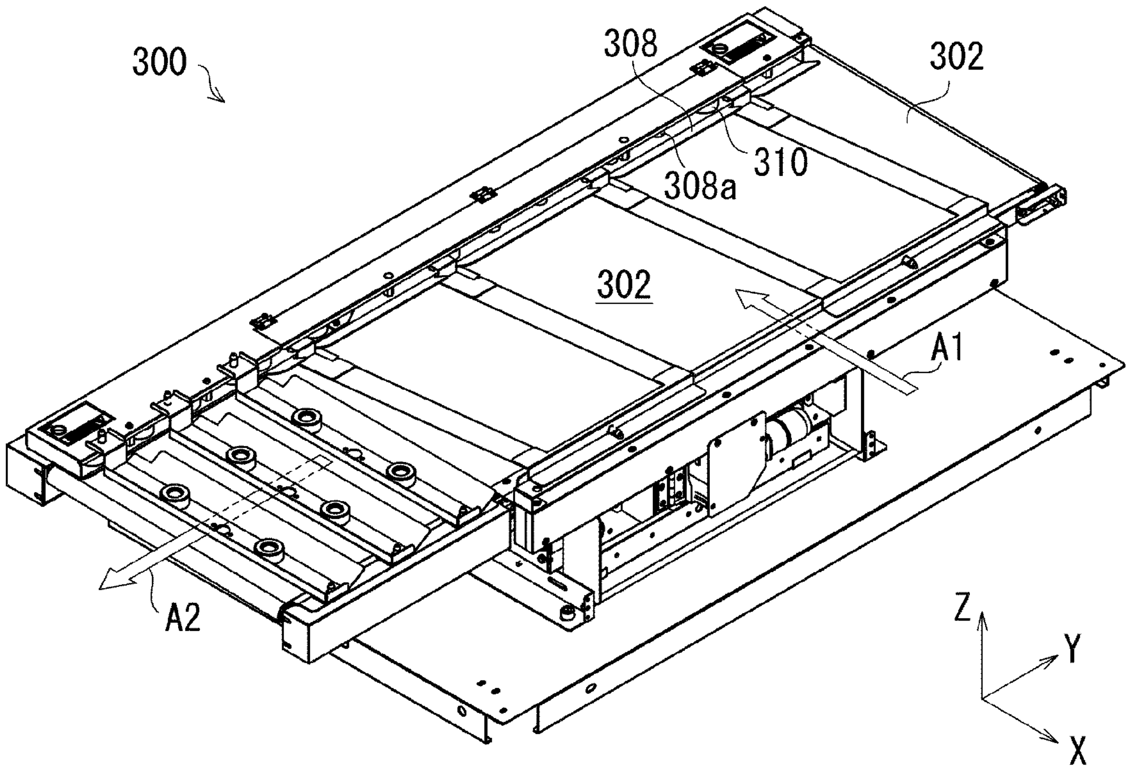
FIG. 16 is a perspective view of an intermediate conveyance apparatus.
Figure 17:
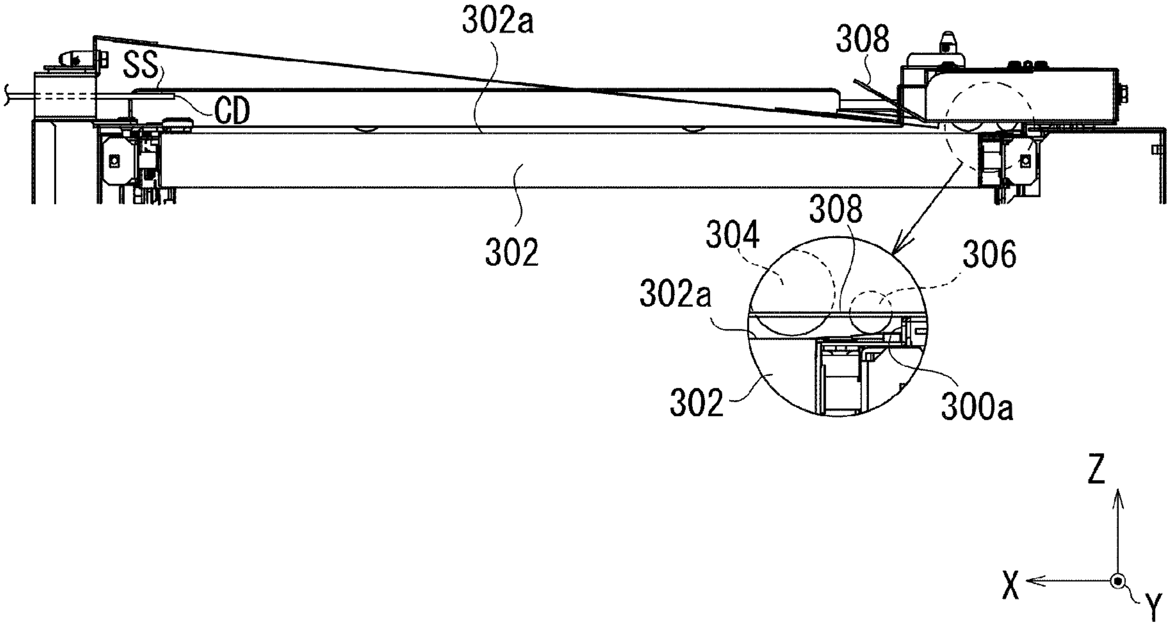
FIG. 17 is a side view of the intermediate conveyance apparatus.

FIG. 16 is a perspective view of the intermediate conveyance apparatus. In addition, FIG. 17 is a side view of the intermediate conveyance apparatus. Then, FIG. 18 is a partially exploded view of the intermediate conveyance apparatus.

Figure 18:
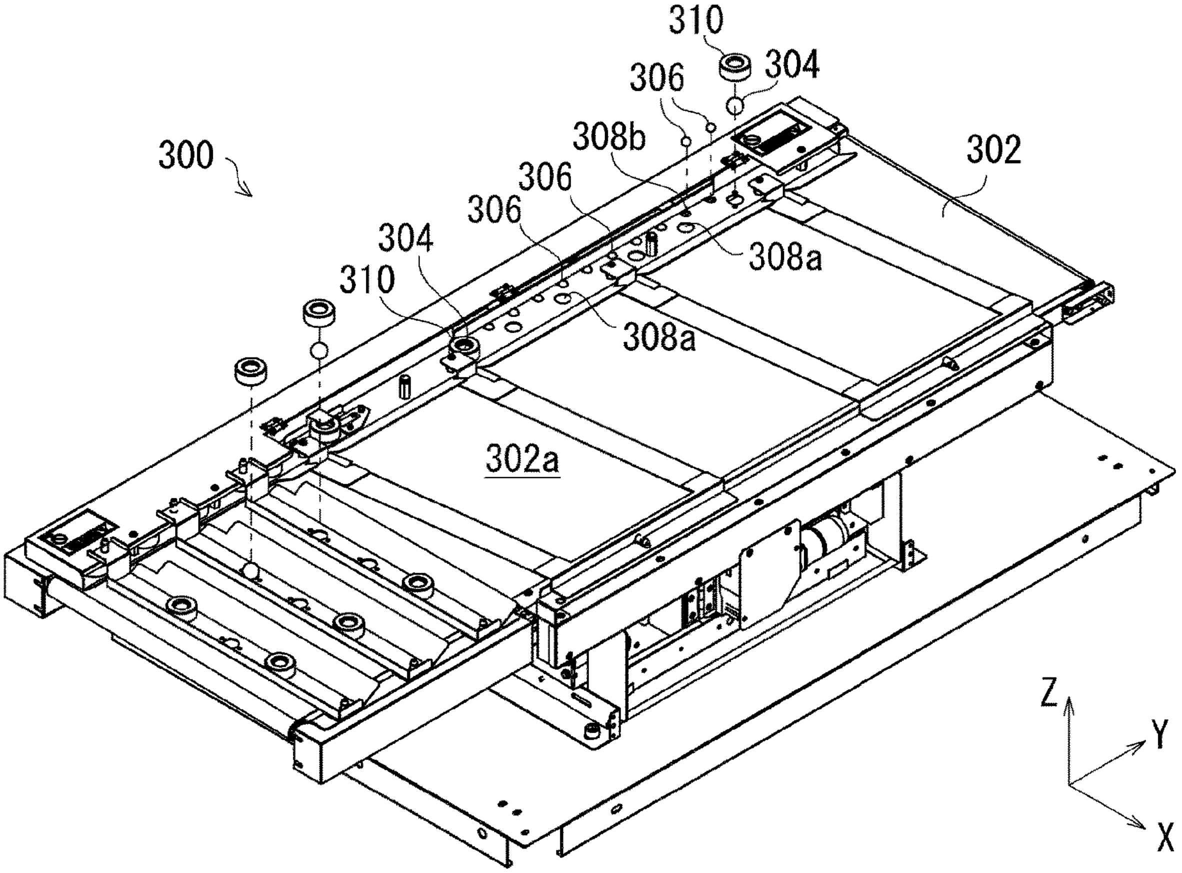
FIG. 18 is a partially exploded view of the intermediate conveyance apparatus.

As shown in FIGS. 16 to 18, the intermediate conveyance apparatus 300 includes a belt conveyor 302 as a mechanism (third conveying mechanism) that conveys the sheet piece SS output from the first sheet processing apparatus 100 toward the second sheet processing apparatus 200. The belt conveyor 302 conveys the sheet piece SS placed on the placement surface 302*a* in the conveying direction F2 (Y-axis direction). It should be noted that in FIG. 16, a hollow arrow Al indicates a supply direction of the sheet piece SS from the first sheet processing apparatus 100 to the intermediate conveyance apparatus 300. In addition, a hollow arrow A2 indicates a supply direction of the sheet piece SS from the intermediate conveyance apparatus 300 to the second sheet processing apparatus 200.

As shown in FIG. 17, the intermediate conveyance apparatus 300 includes a guide surface 300*a*that extends in the conveying direction F2 (Y-axis direction) and guides the cutting end CE of the sheet piece SS on the belt conveyor 302. The sheet piece SS is vigorous1y ejected from the first sheet processing apparatus 100 toward the placement surface 302*a* of the belt conveyor 302. As a result, the cutting end CE of the sheet piece SS comes into contact with the guide surface 300*a*.

When the sheet piece SS is vigorous1y ejected, the cutting end CE of the sheet piece SS is bounced back to the guide surface 300*a*, and as a result, the cutting end CE may be separated from the guide surface 300*a*. In order for the cutting end CE having been in contact with the guide surface 300*a*to maintain the contact without being bounced back, a plurality of spheres 304 and 306 that press the sheet piece SS from above are provided in the intermediate conveyance apparatus 300.

As shown in FIGS. 17 and 18, the plurality of spheres 304 and 306 come into contact with the upper surface of the sheet piece SS on the belt conveyor 302 through the through holes 308*a* and 308*b* formed in the plate-shaped cover member 308 positioned above the guide surface 300*a*. Therefore, the sheet piece SS gets into between the spheres 304 and 306 and the belt conveyor 302, and the cutting end CE thereof comes into contact with the guide surface 300*a*. In order for the sheet piece SS to be sandwiched between the spheres 304 and 306 and the belt conveyor 302, the cutting end CE thereof is maintained in a state of being in contact with the guide surface 300*a*without being bounced back. As a result, the guide surface 300*a*can guide the cutting end CE of the sheet piece SS.

It should be noted that the sphere 304 is larger than the sphere 306. In addition, a plurality of through holes 308*a* and 308*b* through which the spheres 304 and 306 pass are formed at various places in the cover member 308. This is because the type of the spheres 304 and 306 to be used and the places where the spheres 304 and 306 are arranged are changed according to the size of the sheet piece SS. For example, when the sheet piece SS is thin, small spheres 306 are used. In addition, for example, when the size of the sheet piece SS is large, many spheres 304 and 306 are set in many through holes 308*a* and 308*b*. It should be noted that in order to maintain the large sphere 304 in a state of being set in the through hole 308*a*, a cylindrical holder 310 that houses the sphere 304 and is placed on the cover member 308 is used.

Finally, a control system of the sheet processing system of the example will be described.

Figure 19:
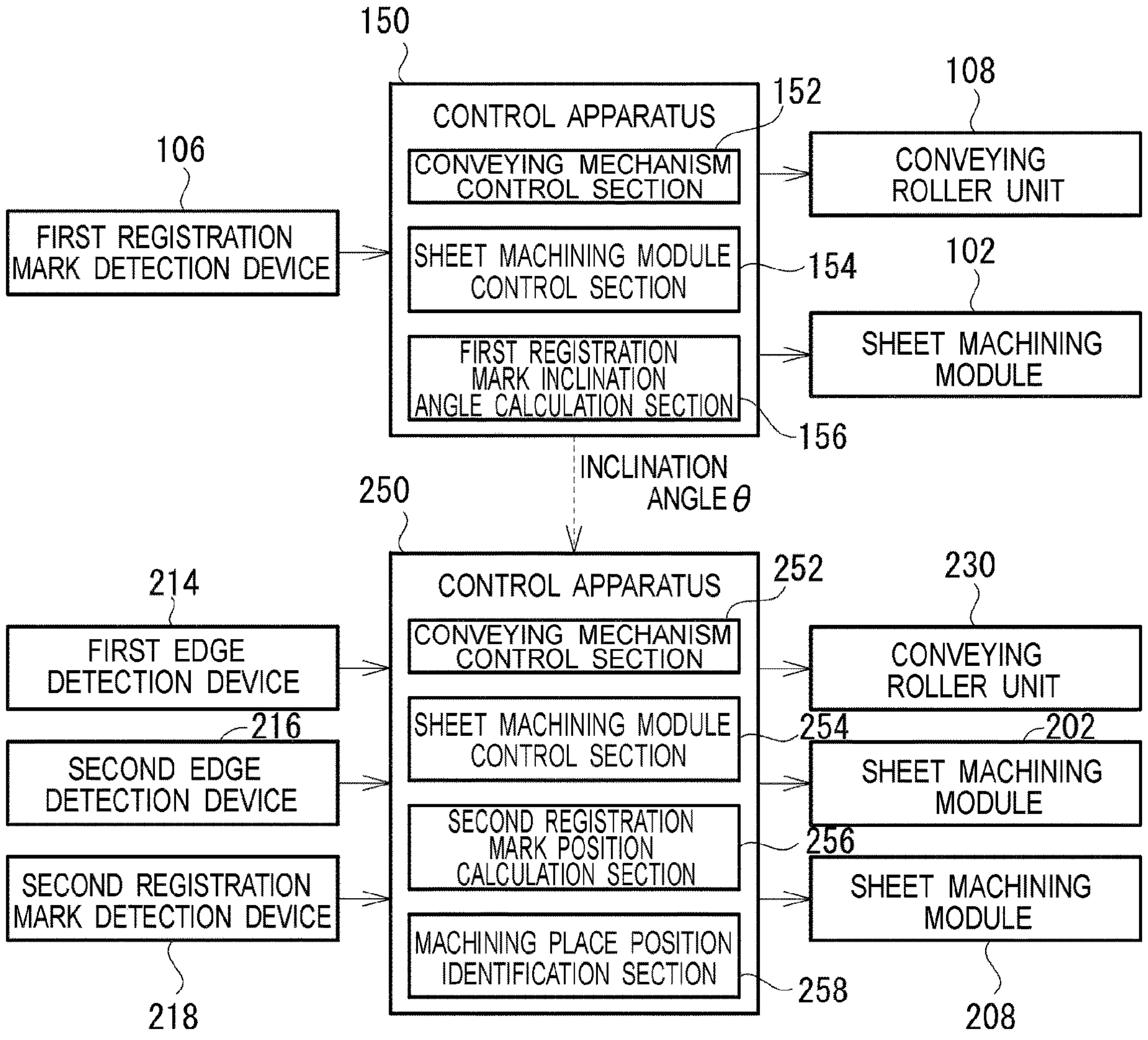
FIG. 19 is a block diagram showing a control system of the sheet processing system.

FIG. 19 is a block diagram showing a control system of the sheet processing system. It should be noted that FIG. 19 shows only components necessary for control closely related to the embodiment (example) of the present disclosure.

As shown in FIG. 19, the sheet processing system 10 includes a control apparatus 150 that controls the first sheet processing apparatus 100 and a control apparatus 250 that controls the second sheet processing apparatus 200.

The control apparatus 150 includes a conveying mechanism control section 152 that controls the conveying roller unit 108 of the first sheet processing apparatus 100, a sheet processing module control section 154 that controls the sheet processing module 102, and a first registration mark inclination angle calculation section 156 that calculates an inclination angle θ of the first registration mark R1.

The control apparatus 150 includes, for example, a processor such as a CPU and a storage apparatus such as a memory. According to the program stored in the storage apparatus, the processor operates as the conveying mechanism control section 152, the sheet processing module control section 154, or the first registration mark inclination angle calculation section 156.

It should be noted that the storage apparatus of the control apparatus 150 stores the information on the material sheet MS, that is, the information on the shape of the material sheet MS and the information on the positional relationship among the first registration mark R1, the second registration mark R2, and the image FP (processing place) on the material sheet MS.

The conveying mechanism control section 152 of the control apparatus 150 controls the rotation speed of the conveying roller 110 of each of the plurality of conveying roller units 108 to control the conveyance speed of the material sheet MS or the sheet piece SS in the conveying direction F1 (X-axis direction) in the first sheet processing apparatus 100.

The sheet processing module control section 154 of the control apparatus 150 controls the moving speed and the moving direction of the sheet processing unit 124 in the sheet processing module 102, and the rotation speed of the pair of rotary cutting blades 104A and 104B. In addition, the sheet processing module control section 154 controls the tilting mechanism 140 to control the inclination (inclination in the cutting direction CD) of the sheet processing module 102 with respect to the conveying direction F1 (X-axis direction).

The first registration mark inclination angle calculation section 156 of the control apparatus 150 calculates the inclination angle θ of the first registration mark R1 with respect to the conveying direction F1 (X-axis direction) based on the detection results of the plurality of first registration mark detection devices 106. The control apparatus 150 transmits the calculated inclination angle θ to the control apparatus 250 of the second sheet processing apparatus 200.

The control apparatus 250 includes a conveying mechanism control section 252 that controls the conveying roller unit 230 of the second sheet processing apparatus 200, a sheet processing module control section 254 that controls the sheet processing modules 202 and 208, a second registration mark position calculation section 256 that calculates the position on the conveyance path of the second registration mark R2, and a processing place position identification section 258 that identifies the position on the conveyance path of the processing place of the sheet piece SS.

The control apparatus 250 includes, for example, a processor such as a CPU and a storage apparatus such as a memory. According to the program stored in the storage apparatus, the processor operates as the conveying mechanism control section 252, the sheet processing module control section 254, the second registration mark position calculation section 256, or the processing place position identification section 258. It should be noted that the storage apparatus of the control apparatus 250 stores the information on the material sheet MS, that is, the information on the positional relationship between the second registration mark R2 and the image FP (processing place) on the material sheet MS.

The conveying mechanism control section 252 of the control apparatus 250 controls the rotation speed of the conveying roller 232 of each of the plurality of conveying roller units 230 to control the conveyance speed of the sheet piece SS in the conveying direction F2 (Y-axis direction) in the second sheet processing apparatus 200.

The sheet processing module control section 254 of the control is apparatus 250 controls the rotation speed and position of the pair of rotary cutting blades 204A and 204B and the rotation speed and position of the pair of rotary cutting blades 206A and 206B in the sheet processing module 202. In addition, the sheet processing module control section 254 controls the elevating operation of the shearing blade 210 in the sheet processing module 208. It should be noted that in the present example, other sheet processing modules 236 to 244 are not used, but when used, the sheet processing module control section 254 controls the other sheet processing modules 236 to 244.

As described above with reference to FIG. 3, the second registration mark position calculation section 256 of the control apparatus 250 calculates the position on the conveyance path of the second registration mark R2 in the conveying direction F2 (Y-axis direction) based on the detection result of the first edge detection device 214 and the inclination angle a transmitted from the first sheet processing apparatus 100.

As described above with reference to FIG. 3, the processing place position identification section 258 of the control apparatus 250 identifies the position on the conveyance path of the processing place of the sheet piece SS based on the detection result of the second registration mark detection device 218.

According to the present embodiment as described above, in the sheet processing system 10 in which the inclination angle θ in the cutting direction CD of the sheet with respect to the sheet conveying direction F1 can be adjusted and which performs processing on the sheet piece SS produced by the cutting, it is possible to suppress a decrease in the processing accuracy.

Although the present disclosure has been described with reference to the above-described embodiment, the embodiment of the present disclosure is not limited thereto.

For example, in the case of the above-described embodiment, as shown in FIG. 2, the material sheet MS has a rectangular shape. However, the embodiment of the present disclosure is not limited thereto. For example, the shape of the material sheet MS only needs to be a polygon.

In the case of the above-described embodiment, the processing on the sheet piece SS based on the inclination angle e of the second sheet processing apparatus 200 is trimming processing of trimming the image FP on the sheet piece SS, but the embodiment of the present disclosure is not limited thereto. For example, the processing performed on the sheet pieces SS by the second sheet processing apparatus 200 based on the inclination angle a may be perforation forming processing, crease forming processing, or the like. In the embodiment of the present disclosure, the processing executed on the sheet piece by the second sheet processing apparatus only needs to be processing in which the processing place thereof is determined in advance.

Furthermore, in the case of the above-described embodiment, the conveying direction F1 (X-axis direction) of the material sheet MS (or the sheet piece SS) of the first sheet processing apparatus 100 and the conveying direction F2 (Y-axis direction) of the sheet piece SS of the second sheet processing apparatus 200 are different from each other by 90 degrees. In addition, to that end, the intermediate conveyance apparatus 300 that changes the conveying direction of the sheet piece SS from the conveying direction F1 to the conveying direction F2 is disposed between the first sheet processing apparatus 100 and the second sheet processing apparatus 200. However, the embodiment of the present disclosure is not limited thereto. For example, a rotary table in which the conveying direction F1 and the conveying direction F2 are the same direction and the sheet piece SS is rotated by 90 degrees may be disposed between the first sheet processing apparatus 100 and the second sheet processing apparatus 200.

Furthermore, in the case of the above-described embodiment, the sheet processing system 10 includes a plurality of sheet processing apparatuses, but the embodiment of the present disclosure is not limited thereto. The sheet processing system may include one apparatus.

In addition, in the case of the above-described embodiment, as shown in FIG. 2, the material sheet MS to be processed by the sheet processing system 10 includes a first registration mark R1 and a second registration mark R2 necessary for sheet processing. In addition, the first registration mark R1 is linear, and the second registration mark R2 is L-shaped. However, the shapes of the first registration mark R1 and the second registration mark R2 are not limited thereto. For example, only a portion that can enter the detection area of the first registration mark detection device 106 of the first registration mark R1 may be linear.

Other marks may be provided on the material sheet instead of the first registration mark R1 and/or the second registration mark R2. That is, a mark detectable and having a shape that can uniquely calculate the inclination of the material sheet MS with respect to the conveying direction and the position on the conveyance path of the image FP only needs to be on the material sheet.

Figure 20:
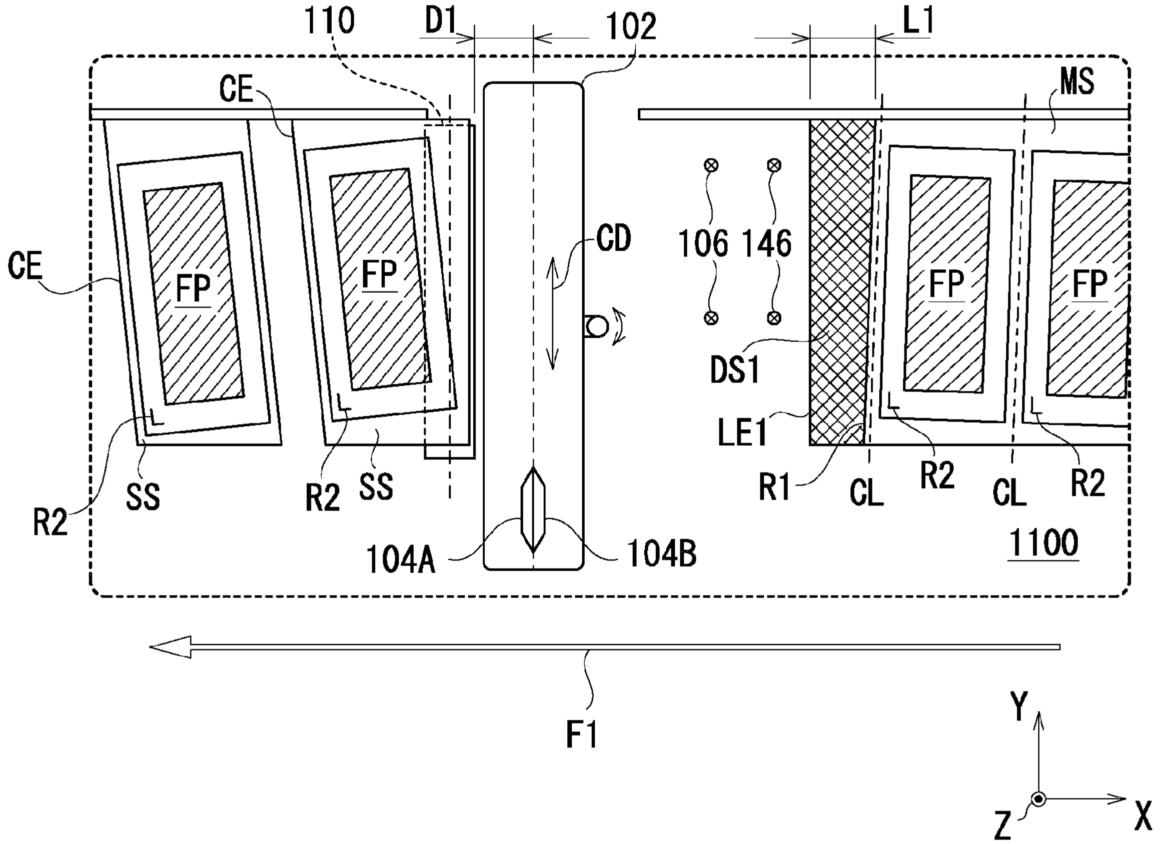
FIG. 20 is a schematic configuration diagram of a first sheet processing apparatus of a sheet processing system according to another embodiment.
Figure 21:
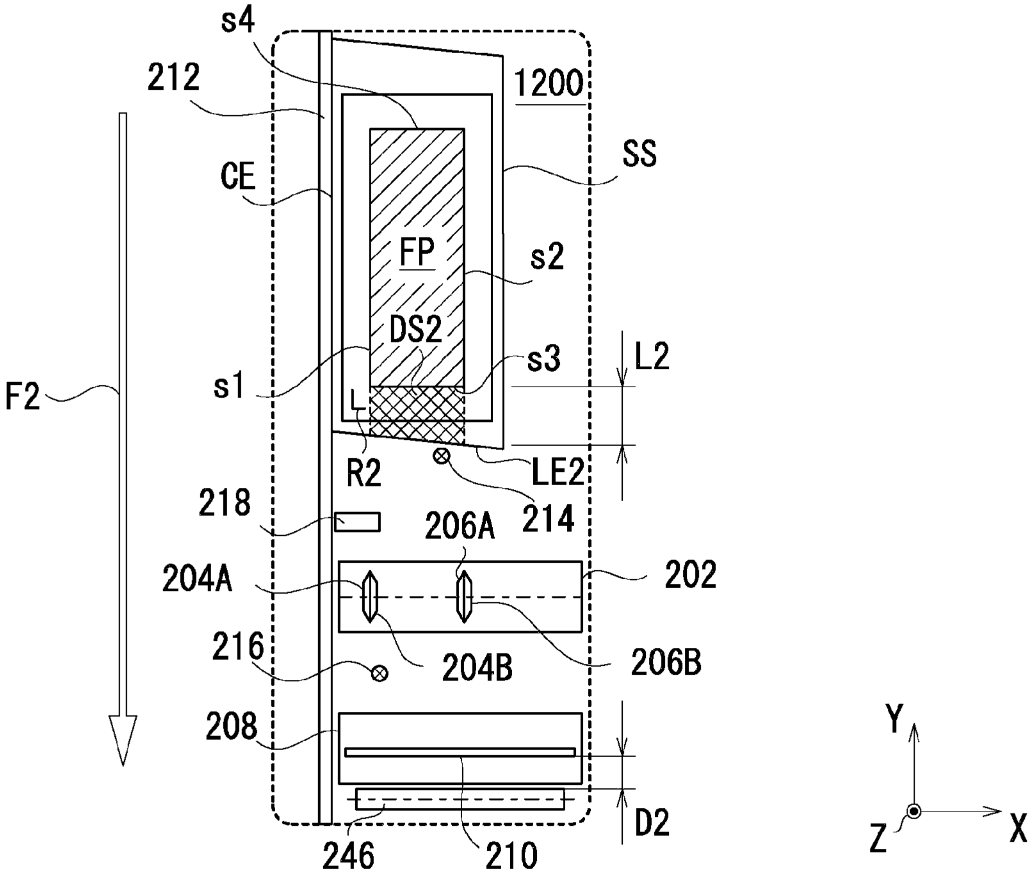
FIG. 21 is a schematic diagram of a second sheet processing apparatus of a sheet processing system according to another embodiment.

FIG. 20 is a schematic configuration diagram of a first sheet processing apparatus of a sheet processing system according to another embodiment. In addition, FIG. 21 is a schematic diagram of a second sheet processing apparatus of a sheet processing system according to another embodiment.

As shown in FIG. 20, in the first sheet processing apparatus 1100, the material sheet MS is cut along the first registration mark R1 by the sheet processing module 102. As a result, the margin portion DS1 (first margin portion) (portion indicated by cross hatching) of the material sheet MS downstream of the first registration mark R1 in the conveying direction F1 (X-axis direction) is cut off. The margin portion DS1 falls through between the lower rotary cutting blade 104B of the sheet processing module 102 and the conveying roller 110 of the conveying roller unit 108 downstream thereof. At this time, when the margin portion DS1 is too large, there is a possibility that the margin portion DS1 does not fall.

Specifically, as shown in FIG. 20, when the longest length L1 in the conveying direction F1 (X-axis direction) of the margin portion DS1 is larger than the interval D1 between the lower rotary cutting blade 104B of the sheet processing module 102 and the conveying roller 110 of the conveying roller unit 108 downstream thereof, there is a possibility that the margin portion DS1 does not fall through therebetween. Thus, the sheet processing module 102 cuts the margin portion DS1 into a plurality of cut pieces, a length in the conveying to direction F1 of each of the plurality of cut pieces being smaller than a predetermined length (first predetermined length) (that is, the interval D1).

In order to calculate the longest length L1 in the conveying direction F1 (X-axis direction) of the margin portion DS1, the first sheet processing apparatus 1100 includes a plurality of edge detection devices 146 is arranged so as to have different positions in a direction (Y-axis direction) orthogonal to the conveying direction F1 and each detecting the leading end LE1 of the material sheet MS.

The inclination angle of the leading end LE1 of the material sheet MS with respect to the conveying direction F1 (X-axis direction) can be calculated based on the detection timing of the leading end LE1 of the material sheet MS of each of the plurality of edge detection devices 146 and the conveyance speed of the material sheet MS. In addition, as described above, the inclination angle of the first registration mark R1 with respect to the conveying direction F1 can be calculated based on the detection timing of each of the plurality of first registration mark detection devices 106 and the conveyance speed of the material sheet MS. Then, the positional relationship between the leading end LE1 of the material sheet MS and the first registration mark R1 can be calculated based on the positional relationship between the edge detection device 146 and the first registration mark detection device 106. Based on these calculation results, the longest length L1 in the conveying direction F1 of the margin portion DS1 can be calculated.

The control apparatus of the first sheet processing apparatus 1100 calculates the longest length L1 in the conveying direction F1 (X-axis direction) of the margin portion DS1 of the material sheet MS based on the detection results of the plurality of edge detection devices 146 and the plurality of first registration mark detection devices 106 by the above-described method. When the calculated longest length L1 is larger than the first predetermined length, that is, the interval D1 between the lower rotary cutting blade 104B and the conveying roller 110, the control apparatus controls the sheet processing module 102 to cut the margin portion DS1 into a plurality of cut pieces. That is, the sheet processing module 102 cuts the margin portion DS1 of the material sheet MS before being cut off at least once to form a plurality of cut pieces in which the longest length in the conveying direction F1 is smaller than the first predetermined length. Thus, the margin portion DS1 can fall through between the lower rotary cutting blade 104B and the conveying roller 110.

It should be noted that, when the first registration mark detection device 106 is a device that can also detect the leading end LE1 of the material sheet MS, it is not necessary to provide the edge detection device 146 in the first sheet processing apparatus 1100.

Similarly, as shown in FIG. 21, also in the second sheet processing apparatus 1200, a margin portion DS2 (second margin portion) (portion indicated by cross hatching) being a portion downstream in the conveying direction F2 of the sheet piece SS to be cut off by the shearing blade 210 (second cutting blade) of the sheet processing module 208 is cut at least once by the shearing blade 210 in some cases. Therefore, the longest length L2 in the conveying direction F2 (Y-axis direction) of the margin portion DS2 is calculated..

The longest length L2 in the conveying direction F2 (Y-axis direction) of the margin portion DS2 can be calculated, based on the inclination angle B of the first registration mark R1 calculated in the first sheet processing apparatus 1100 (See, FIG. 1). Specifically, firstly, based on the detection timing of a leading end LE2 of the sheet piece SS of first edge detection devices 214 and the conveyance speed of the sheet piece SS, a position of the leading end LE2 on the conveyance path can be calculated. Also, based on based on the detection timing of the second registration mark R2 of the second registration mark detection device 218 and the conveyance speed of the sheet piece SS, a position on the conveyance path of the third side s3 fo the image FP can identified. Further, based on the inclination angle θ of the first registration mark R1, an inclination angle with respect to the conveying direction F2 of the leading end LE2 of the sheet piece SS can be calculated. Based on these calculation results, the longest length L2 in the conveying direction F2 of the margin portion DS2 can be calculated.

The control apparatus of the second sheet processing apparatus 1200 calculates the longest length L2 in the conveying direction F2 (Y-axis direction) of the margin portion DS2 of the sheet piece SS, based on the calculated inclination angle θ of the first registration mark R1 from the control apparatus of the first sheet processing apparatus 1100 and the detection results of the first edge detection device 214 and the second registration mark detection device 218 by the above-described method. When the calculated longest length L2 is larger than the second predetermined length, that is, the interval D2 between the shearing blade 210 of the sheet processing module 208 and the conveying roller 246 positioned downstream thereof, the control apparatus controls the sheet processing module 208 to cut the margin portion DS2. That is, the sheet processing module 208 cuts the margin portion DS2 before being cut off at least once to form a plurality of cut pieces in which the longest length in the conveying direction F2 is smaller than the second predetermined length. Thus, the margin portion DS2 can fall through between the shearing blade 210 and the conveying roller 246 positioned downstream thereof.

That is, in a broad sense, an embodiment of the present disclosure is a sheet processing system including: a first conveying mechanism is configured to convey a material sheet in a first direction; a first registration mark detection device configured to detect a first mark of the material sheet; a first mark inclination angle calculation section configured to calculate an inclination angle of the first mark with respect to the first direction based on a detection result of the first mark detection device; a cutting blade configured to cut the material sheet in a cutting direction intersecting a first direction to produce a plurality of sheet pieces; a cutting direction adjustment mechanism configured to adjust a cutting direction of the cutting blade to a direction of the inclination angle with respect to the first direction; a second conveying mechanism configured to convey the sheet piece in a second direction; a guide member configured to extend in the second direction and to guide a cutting end of the sheet piece formed by the cutting blade; a processing place position identification section configured to identify a position on a conveyance path of a processing place of the sheet piece based on the inclination angle; and a processing mechanism configured to perform processing on the processing place whose the position on the conveyance path is identified.

As described above, the embodiments are described as the exemplification of the technique in the present disclosure. To that end, accompanying drawings and detailed description are provided. Therefore, among the components described in the accompanying drawings and the detailed description, not only the components essential for solving the problem, but also the components not essential for solving the problem may be included in order to exemplify the above technique. Therefore, it should not be recognized that these non-essential components are essential immediately because these non-essential components are described in the accompanying drawings and the In addition, since the above preferred embodiments are for exemplifying the technique in the present disclosure, various changes, substitutions, additions, omissions, and the like can be made within the scope of the claims or the equivalent thereof.

The present disclosure is applicable to a sheet processing system that processes a sheet while conveying the sheet.

What is claimed is:

1. A sheet processing system comprising:

a first conveying mechanism configured to convey a material sheet in a first direction;

a first mark detection device configured to detect a first mark of the material sheet;

a cutting blade configured to cut the material sheet in a cutting direction intersecting the first direction to produce a plurality of sheet pieces;

a cutting direction adjustment mechanism configured to adjust a cutting direction of the cutting blade;

a second conveying mechanism configured to convey a sheet piece of the plurality of sheet pieces in a second direction differing from the first direction;

a guide member configured to extend in the second direction and to guide a cutting end of the sheet piece formed by the cutting blade;

a processing mechanism configured to first perform a longitudinal cut of the sheet piece being guided by the guide member in the second direction at a first processing position and a lateral cut of the sheet piece in a direction orthogonal to the second direction at a second processing position;

a control system configured to control the first conveying mechanism, the cutting blade, the cutting direction adjustment mechanism, the second conveying mechanism, the first processing position, the second processing position, and the processing mechanism, wherein the control system includes:

a first mark inclination angle calculation section configured to calculate an inclination angle of the first mark with respect to the first direction based on a detection result of the first mark detection device; and a processing place position identification section configured to identify a position on a conveyance path of a processing place of the sheet piece based on the inclination angle, wherein the control system controls the cutting direction adjustment mechanism so that the cutting direction adjustment mechanism moves the cutting blade to adjust a cutting direction of the cutting blade to a direction of the inclination angle with respect to the first direction, and wherein the control system controls the processing mechanism to perform processing on the processing place of the sheet piece whose the position on the conveyance path is identified;

first and second edge detection devices configured to detect a leading end of the sheet piece conveyed by the second conveying mechanism;

a second mark detection device configured to perform sensing at a timing based on a calculated position on a conveyance path of a second mark and a conveyance speed of the sheet piece to detect the second mark, and the control system further comprises a second mark position calculation section configured to calculate a position on a conveyance path of a second mark of the sheet piece based on a position on a conveyance path of a portion of a leading end of the sheet piece detected by the first edge detection device and the inclination angle; and wherein the processing place position identification section identifies the position on the conveyance path of the processing place of the sheet piece based on a detection result of the second mark detection device, the second edge detection device is disposed downstream of the second mark detection device in the second direction, the position on the conveyance path of the processing place downstream of the second mark detection device in the second direction is calculated, based on a portion of the leading end of the sheet piece detected by the second edge detection device and the inclination angle, and the processing mechanism perform processing on the processing place of the sheet piece whose the position on the conveyance path is identified based on the detection result of the second edge detection device.

2. The sheet processing system according to claim 1, further comprising:

the material sheet, and wherein when a longest length in the first direction of a first margin portion being a portion downstream in the first direction of the material sheet to be cut off by the cutting blade is larger than a first predetermined length, the cutting blade is configured to cut the first margin portion before being cut off into a plurality of cut pieces, a longest length in the first direction of each of the plurality of cut pieces being smaller than the first predetermined length.

3. The sheet processing system according to claim 1, wherein the processing mechanism has a first processing unit and a second processing unit, the first conveyance mechanism, the first mark detection device, the cutting blade, the first mark inclination angle calculation section, and the cutting direction adjustment mechanism are provided in a first sheet processing apparatus, and the second conveying mechanism, the guide member, the processing place position identification section, the processing mechanism, the edge detection device, the second mark position calculation section, the first processing unit, the second processing unit, and the second mark detection device are provided in a second sheet processing apparatus.

4. The sheet processing system according to claim 1, wherein the first direction and the second direction are orthogonal to each other, the sheet processing system further comprising a third conveying mechanism disposed between the first conveying mechanism and the second conveying mechanism, the third conveying mechanism configured to change a conveying direction of the sheet piece from the first direction to the second direction.

5. The sheet processing system according to claim 1, wherein the control system identifies the processing place of a respective one of the sheet pieces as an outline of an image on the respective sheet piece, and the processing mechanism performs processing of trimming the image.

6. The sheet processing system according to claim 5, wherein the processing mechanism includes a second cutting blade configured to cut the sheet piece along a side downstream in the second conveying direction of the image, and when a longest length in the second direction of a second margin portion being a portion downstream in the second direction of the sheet piece to be cut off by the second cutting blade is larger than a second predetermined length, the second cutting blade is configured to cut the second margin portion before being cut off into a plurality of cut pieces, a longest length in the second direction of each of the plurality of cut pieces being smaller than the second predetermined length.

7. A sheet processing system comprising:

a first conveying mechanism configured to convey a material sheet in a first direction;

a first mark detection device configured to detect a first mark of the material sheet;

a cutting blade configured to cut the material sheet in a cutting direction intersecting the first direction to produce a plurality of sheet pieces;

a cutting direction adjustment mechanism configured to adjust a cutting direction of the cutting blade;

a second conveying mechanism configured to convey a sheet piece of the plurality of sheet pieces in a second direction differing from the first direction;

a guide member configured to extend in the second direction and to guide a cutting end of the sheet piece formed by the cutting blade;

a processing mechanism configured to perform processing on the plurality of sheet pieces; and a control system configured to control the first conveying mechanism, the cutting blade, the cutting direction adjustment mechanism, the second conveying mechanism, and the processing mechanism, wherein the control system includes:

a first mark inclination angle calculation section configured to calculate an inclination angle of the first mark with respect to the first direction based on a detection result of the first mark detection device; and a processing place position identification section configured to identify a position on a conveyance path of a processing place of the sheet piece based on the inclination angle, wherein the control system controls the cutting direction adjustment mechanism so that the cutting direction adjustment mechanism moves the cutting blade to adjust a cutting direction of the cutting blade to a direction of the inclination angle with respect to the first direction, and wherein the control system controls the processing mechanism to perform processing on the processing place of the sheet piece whose the position on the conveyance path is identified;

first and second edge detection devices configured to detect a leading end of the sheet piece conveyed by the second conveying mechanism;

a second mark detection device configured to perform sensing at a timing based on a calculated position on a conveyance path of a second mark and a conveyance speed of the sheet piece to detect the second mark, and the control system further comprises a second mark position calculation section configured to calculate a position on a conveyance path of a second mark of the sheet piece based on a position on a conveyance path of a portion of a leading end of the sheet piece detected by the first edge detection device and the inclination angle; and wherein the processing place position identification section identifies the position on the conveyance path of the processing place of the sheet piece based on a detection result of the second mark detection device, the second edge detection device is disposed downstream of the second mark detection device in the second direction, the position on the conveyance path of the processing place downstream of the second mark detection device in the second direction is calculated, based on a portion of the leading end of the sheet piece detected by the second edge detection device and the inclination angle, and the processing mechanism perform processing on the processing place of the sheet piece whose the position on the conveyance path is identified based on the detection result of the second edge detection device.

8. The sheet processing system according to claim 1, wherein the control system controls the processing mechanism to perform a lateral cutting of the sheet piece based on the detection result of the second edge detection device.

* * * * *